US010250843B2

(12) United States Patent
Kano

(10) Patent No.: US 10,250,843 B2
(45) Date of Patent: Apr. 2, 2019

(54) IMAGING APPARATUS AND INFORMATION PROCESSING APPARATUS

(75) Inventor: Shinya Kano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 585 days.

(21) Appl. No.: 14/235,923

(22) PCT Filed: Aug. 27, 2012

(86) PCT No.: PCT/JP2012/005344

§ 371 (c)(1), (2), (4) Date: Jan. 29, 2014

(87) PCT Pub. No.: WO2013/035260

PCT Pub. Date: Mar. 14, 2013

(65) Prior Publication Data

US 2014/0178032 A1 Jun. 26, 2014

(30) Foreign Application Priority Data

Sep. 6, 2011 (JP) ................................ 2011-193566

(51) Int. Cl.

*H04N 5/77* (2006.01)
*H04N 5/91* (2006.01)
(Continued)

(52) U.S. Cl.

CPC .......... *H04N 5/772* (2013.01); *G11B 27/034* (2013.01); *G11B 27/105* (2013.01);
(Continued)

(58) Field of Classification Search

USPC ........................................ 386/227, 224, 248
See application file for complete search history.

(56) References Cited

U.S. PATENT DOCUMENTS 9,734,399 B2 * 8/2017 Flores ................ G06K 9/00651
2004/0247308 A1 12/2004 Kawade
(Continued)

FOREIGN PATENT DOCUMENTS

JP 2004-342252 A 12/2004
JP 2004-343627 A 12/2004
(Continued)

OTHER PUBLICATIONS

International Search Report dated Oct. 2, 2012 in PCT/JP2012/005344.

*Primary Examiner* — Helen Shibru
(74) *Attorney, Agent, or Firm* — Chip Law Group

(57) ABSTRACT

An imaging unit captures a moving image containing a plurality of images in a time-series order. A position acquisition unit acquires positions at which the plurality of images are captured. An offset calculation unit calculates, as an offset, a difference between a reference value that is any of the positions at which the plurality of images are captured and each of the positions to associate the offset with the image whose position is acquired. A metadata generation unit generates, as moving image metadata that accompanies the moving image, metadata containing the reference value and generates, as image metadata that accompanies the image corresponding to the offset, metadata containing the offset, for each of the acquired positions.

10 Claims, 34 Drawing Sheets

150
Processing unit
Input and output interface 151
ROM 152
RAM 153
154
Processor 155
Operation unit 161
GPS unit 165
Display unit 170
Display control unit 169
Imaging unit 162
Imaging signal processing unit 163
Coding processing unit 164
Multiplexing unit 166
Medium access unit 167
Recording medium 168

(51) Int. Cl.

| | |
|---|---|
| ***G11B 27/32*** | (2006.01) |
| ***H04N 9/804*** | (2006.01) |
| ***G11B 27/034*** | (2006.01) |
| ***G11B 27/10*** | (2006.01) |
| ***H04N 9/82*** | (2006.01) |

(52) U.S. Cl.

CPC ............. *G11B 27/322* (2013.01); *H04N 5/91* (2013.01); *H04N 9/8047* (2013.01); *H04N 9/8205* (2013.01)

(56) References Cited

U.S. PATENT DOCUMENTS

2007/0127888 A1* 6/2007 Hayashi ............... G11B 27/322 386/230
2010/0034517 A1* 2/2010 Maeda ................. G11B 27/329 386/248
2010/0039529 A1 2/2010 Fujimaki et al.
2010/0309226 A1* 12/2010 Quack .............. G06F 17/30244 345/634
2011/0007131 A1* 1/2011 Okada .................. H04N 19/597 348/42
2013/0070117 A1* 3/2013 Imagawa ................ G06T 5/008 348/222.1
2013/0129153 A1* 5/2013 Miyashita ......... G06F 17/30268 382/106
2017/0161651 A1* 6/2017 Demarchi ............ G06Q 10/025

FOREIGN PATENT DOCUMENTS

JP 2006-186913 A 7/2006
JP 2010-45699 A 2/2010

* cited by examiner

| RBP | Field name | Contents | Number of bytes |
|---|---|---|---|
| Additional recording information identifier | | | Total 12 |
| 0 to 7 | ARI_DAT_ID | Additional recording information data identifier | 8 |
| 8 to 9 | ARI_DAT_VER | Version of additional recording information | 2 |
| 10 to 11 | reserved | reserved | 2 |
| Application | | | Total 52 |
| 12 to 16 | VND_NAME | Vender name | 5 |
| 17 to 28 | PRD_NAME | Product name | 12 |
| 29 | APL_ID | Application ID | 1 |
| 30 to 61 | MNFI_DATA | Manufacturer's Information Data | 32 |
| 62 to 63 | reserved | reserved | 2 |
| Recording time information | | | Total 8 |
| 64 to 65 | VOBU_LCL_TM_ZONE | Time zone in recording | 2 |
| 66 to 70 | VOBU_REC_TM | Recording time | 5 |
| 71 | reserved | reserved | 1 |
| Camera information | | | Total 1872 |
| 72 to 73 | F_NUM | F number | 2 |
| 74 to 77 | EXP_TM | Exposure time | 4 |
| 78 | EXP_PRG | Exposure program | 1 |
| 79 | EXP_PRG_EX | Exposure program extension information | 1 |
| 80 to 81 | EXP_BIS_VAL | Exposure correction value | 2 |
| 82 | AGC | Gain value | 1 |
| 83 to 84 | MAX_APE_VAL | Smallest F number of lens | 2 |
| 85 | FLS | Flash | 1 |
| 86 to 87 | FCL_LEN | Focal position of lens | 2 |
| 88 | CST_REN | Individual image processing | 1 |
| 89 | WHT_BAL | White balance | 1 |
| 90 | SCN_CAP_TYP | Imaging scene type | 1 |
| 91 | FCS_MOD | Focus mode | 1 |
| 92 to 93 | FCS_POS | Subject distance | 2 |
| 94 | IMG_STB | Camera shake correction | 1 |
| 95 | DIG_ZOM | Digital zoom magnification | 1 |
| 96 to 110 | GPS_INFO | Position information | 14 |
| 111 | STB_LIM | Camera shake correction limit | 1 |
| 112 to END | reserved | reserved | |

| reserved | | | |
|---|---|---|---|
| RBP | Field name | Contents | Number of bytes |
| 112 to 126 | Offset_INFO | Offset | 14 |
| ... | ... | ... | ... |

FIG.6

| Time at which position information is acquired | Position information | |
|---|---|---|
| | Latitude | Longitude |
| Time #1 | 35.681382 | 139.766084 |
| Time #2 | 35.681383 | 139.766082 |
| Time #3 | 35.681391 | 139.766076 |
| Time #4 | 35.681401 | 139.766072 |
| ⋮ | ⋮ | ⋮ |
| Time #10 | 35.681392 | 139.766080 |

FIG.7

| Storage location | Reference value | |
|---|---|---|
| | Latitude | Longitude |
| System header | 35.681382 | 139.766084 |

(a) Example of reference value

| Storage location | Offset | |
|---|---|---|
| | Latitude | Longitude |
| ARI_PCK#1 | ±0.000000 | ±0.000000 |
| ARI_PCK#2 | +0.000001 | −0.000002 |
| ARI_PCK#3 | +0.000009 | −0.000008 |
| ARI_PCK#4 | +0.000019 | −0.000012 |
| ⋮ | ⋮ | ⋮ |
| ARI_PCK#10 | +0.000010 | −0.000004 |

(b) Example of offset

FIG.8

| Storage location | Reference value | |
|---|---|---|
| | Latitude | Longitude |
| Entry#1Info | 35.681382 | 139.766084 |

(a) Reference value before connection

| Storage location | Reference value | | Start address | End address |
|---|---|---|---|---|
| | Latitude | Longitude | | |
| Entry#1Info | 35.681382 | 139.766084 | Address#1 | Address#10 |
| Entry#2Info | 35.681391 | 139.766076 | Address#11 | Address #20 |
| ⋮ | ⋮ | ⋮ | ⋮ | ⋮ |

(b) Reference value after connection

FIG.15

| Syntax | Bit length | Outline |
|---|---|---|
| user_data_unregistered(payloadSize) { | | |
| uuid_iso_iec_11578 | 128 | Universally unique identifier |
| type_indicator | 32 | Data type |
| if (type_indicator == 0x4741 3934) { | | |
| cc_data() | | cc_data() structure |
| } else if (type_indicator == 0x4D44 504D) { | | |
| ModifiedDVPackMeta() { | | ModifiedDVPackMeta() structure |
| number_of_modified_dv_pack_entries | 8 | Number of entries |
| for (i=0; i<number_of_modified_dv_pack_entries; i++) { | | |
| one_modified_dv_pack() { | | one_modified_dv_pack() structure |
| mdp_id | 8 | Modified DV Pack ID structure |
| mdp_data | 32 | Modified DV Pack data |
| } | | |
| } | | |
| } | | |
| } | | |
| } | | |

FIG.17

| mdp_id | Name | Outline |
|---|---|---|
| 0x13 | Time Code | Time code |
| 0x14 | Binary Group | Binary group |
| 0x18 | REC Time&Date1 | Imaging date and time 1 |
| 0x19 | REC Time&Date2 | Imaging date and time 2 |
| 0x70 | Consumer Camera1 | Consumer Camera 1 |
| 0x71 | Consumer Camera2 | Consumer Camera 2 |
| 0x73 | Lens | Lens |
| 0x74 | Gain | Gain |
| 0x75 | Pedestal | Pedestal |
| 0x76 | Gamma | Gamma |
| 0x77 | Detail | Contour enhancement |
| 0x7B | Camera Preset | Camera preset |
| 0x7C | Flare | Flare |
| 0x7D | Shading | Shading |
| 0x7E | Knee | Knee |
| 0x7F | Shutter | Shutter |
| 0xA0 | Exposure Time | Exposure time |
| 0xA1 | F Number | F number |
| 0xA2 | Exposure Program | Exposure program |
| 0xA3 | Brightness Value | Brightness value |
| 0xA4 | Exposure Bias Value | Exposure bias value |
| 0xA5 | Max Aperture Value | Maximum aperture value |
| 0xA6 | Flash | Flash |
| 0xA7 | Custon Rendered | Special processing |
| 0xA8 | White Balance | White balance |
| 0xA9 | Focal Length in 35mm Film | Focal length (35 mm film) |
| 0xAA | Scene Capture Type | Imaging scene type |
| 0xAB \| 0xAF | Exif Option | Exif option |

| mdp_id | Name | Outline |
|---|---|---|
| 0xB0 | GPS Version ID | GPS version ID |
| 0xB1 | GPS Latitude Ref | GPS latitude direction |
| 0xB2 | GPS Latitude1 | GPS latitude 1 |
| 0xB3 | GPS Latitude2 | GPS latitude 2 |
| 0xB4 | GPS Latitude3 | GPS latitude 3 |
| 0xB5 | GPS Longitude Ref | GPS longitude direction |
| 0xB6 | GPS Longitude1 | GPS longitude 1 |
| 0xB7 | GPS Longitude2 | GPS longitude 2 |
| 0xB8 | GPS Longitude3 | GPS longitude 3 |
| 0xB9 | GPS Altitude Ref | GPS altitude direction |
| 0xBA | GPS Altitude | GPS altitude |
| 0xBB | GPS Timestamp1 | GPS time stamp 1 |
| 0xBC | GPS Timestamp2 | GPS time stamp 2 |
| 0xBD | GPS Timestamp3 | GPS time stamp 3 |
| 0xBE | GPS Status | GPS operation status |
| 0xBF | GPS Measure Mode | GPS measurement mode |
| 0xC0 | GPS DOP | GPS precision deterioration factor |
| 0xC1 | GPS Speed Ref | GPS speed direction |
| 0xC2 | GPS Speed | GPS speed |
| 0xC3 | GPS Track Ref | GPS track direction |
| 0xC4 | GPS Track | GPS track |
| 0xC5 | GPS Img Direction R | GPS image direction R |
| 0xC6 | GPS Img Direction | GPS image direction |
| 0xC7 | GPS Map Datum1 | GPS map data 1 |
| 0xC8 | GPS Map Datum2 | GPS map data 2 |
| 0xC9 \| 0xCF | GPS Option | GPS option |
| 0xE0 | Maker & Model ID | Maker & model ID |
| 0xE1 \| 0xEF | Maker Option | Maker option |
| Others | Reserved | Reservation |

| Reserved | | |
|---|---|---|
| mdp_id | Name | Outline |
| 0xF1 | Offset Latitude1 | Offset of latitude |
| 0xF2 | Offset Latitude2 | |
| 0xF3 | Offset Latitude3 | |
| 0xF4 | Offset Longitude1 | Offset of longitude |
| 0xF5 | Offset Longitude2 | |
| 0xF6 | Offset Longitude3 | |
| ... | ... | ... |

FIG.18

| Storage location | Address | Offset | |
|---|---|---|---|
| | | Latitude | Longitude |
| MDVP#1 | Address #1 | ±0.000000 | ±0.000000 |
| MDVP#2 | Address #2 | +0.000001 | −0.000002 |
| ⋮ | ⋮ | ⋮ | ⋮ |
| MDVP#9 | Address #9 | +0.000008 | −0.000002 |
| MDVP#10 | Address #10 | +0.000010 | −0.000004 |
| MDVP#11 | Address #11 | ±0.000000 | ±0.000000 |
| MDVP#12 | Address #12 | +0.000001 | +0.000001 |
| ⋮ | ⋮ | ⋮ | ⋮ |
| MDVP#20 | Address #20 | −0.000003 | −0.000003 |
| ⋮ | ⋮ | ⋮ | ⋮ |

FIG.19

| Storage location | Offset | | Start Address | End Address |
|---|---|---|---|---|
| | Latitude | Longitude | | |
| Entry#1Info | ±0.000000 | ±0.000000 | Address #1 | Address #10 |
| Entry#2Info | +0.000009 | −0.000008 | Address #11 | Address #20 |
| ⋮ | ⋮ | ⋮ | ⋮ | ⋮ |

| Storage location | Reference value | |
|---|---|---|
| | Latitude | Longitude |
| Entry_basisInfo | 35.681382 | 139.766084 |

(a) Reference value described in clip information file

| Storage location | Offset | | Start address | End address |
|---|---|---|---|---|
| | Latitude | Longitude | | |
| Entry#1Info | ±0.000000 | ±0.000000 | Address#1 | Address#10 |
| Entry#2Info | +0.000009 | −0.000008 | Address#11 | Address #20 |
| . . . | . . . | . . . | . . . | . . . |

(b) Offset described in clip information file

FIG.25

| Storage location | Reference value | |
|---|---|---|
| | Latitude | Longitude |
| Entry#1Info | 35.681382 | 139.766084 |

(a) Reference value after connection

| Storage location | Address | Offset | |
|---|---|---|---|
| | | Latitude | Longitude |
| MDVP#1 | Address#1 | ±0.000000 | ±0.000000 |
| MDVP#2 | Address#2 | +0.000001 | −0.000002 |
| ⋮ | ⋮ | ⋮ | ⋮ |
| MDVP#9 | Address#9 | +0.00008 | −0.000002 |
| MDVP#10 | Address#10 | +0.000010 | −0.000004 |
| MDVP#11 | Address#11 | +0.00009 | −0.000008 |
| MDVP#12 | Address#12 | +0.000010 | −0.000007 |
| ⋮ | ⋮ | ⋮ | ⋮ |
| MDVP#20 | Address#20 | +0.000006 | −0.000011 |
| ⋮ | ⋮ | ⋮ | ⋮ |

(b) Offset after connection

FIG.28

| Storage location | Reference value | |
|---|---|---|
| | Latitude | Longitude |
| Entry#1_1Info | 35.681382 | 139.766084 |

(a) Reference value of forward moving image file

| Storage location | Reference value | | Start address | End address |
|---|---|---|---|---|
| | Latitude | Longitude | | |
| Entry#2_1Info | 35.681382 | 139.766084 | Address#2_1 | Address#2_2 |
| Entry#2_1Info | 35.681391 | 139.766076 | Address#2_3 | Address#2_13 |
| ⋮ | ⋮ | ⋮ | ⋮ | ⋮ |

(b) Reference value of backward moving image file

FIG.34

| Storage location | Offset | |
|---|---|---|
| | Latitude | Longitude |
| MDVP#1_1 | ±0.000000 | ±0.000000 |
| MDVP#1_2 | +0.000001 | −0.000002 |
| ⋮ | ⋮ | ⋮ |
| MDVP#1_8 | +0.000010 | ±0 |

(a) Offset of forward moving image file

| Storage location | Offset | |
|---|---|---|
| | Latitude | Longitude |
| MDVP#2_1 | +0.000008 | −0.000002 |
| MDVP#2_2 | +0.000010 | −0.000004 |
| MDVP#2_3 | ±0.000000 | ±0.000000 |
| MDVP#2_4 | +0.000001 | +0.000001 |
| ⋮ | ⋮ | ⋮ |
| MDVP#2_12 | −0.000003 | −0.000003 |

(b) Offset of backward moving image file

FIG.35

IMAGING APPARATUS AND INFORMATION PROCESSING APPARATUS

TECHNICAL FIELD

The present technology relates to an imaging apparatus, an information processing apparatus, processing methods in those apparatuses, and programs causing a computer to execute the methods. More specifically, the present technology relates to an imaging apparatus that captures a moving image, an information processing apparatus that processes a moving image, processing methods in those apparatuses, and programs causing a computer to execute the methods.

BACKGROUND ART

Imaging apparatuses such as video cameras and digital cameras that are equipped with GPS (Global Positioning System) modules have been widely prevalent. In such imaging apparatuses, it is possible to acquire position information on a position at which an image is captured as well as to capture moving images and images. An imaging apparatus equipped with a GPS module obtains, as metadata, a date and time at which an image is captured, imaging conditions, acquired position information, and the like and generates a moving image file by multiplexing the metadata into a moving image. In the case where pieces of metadata are multiplexed, those pieces of metadata are multiplexed into a moving image at regular intervals in many cases. In the case where a moving image is coded according to the MPEG (Moving Picture Experts Group) standard, an imaging apparatus that multiplexes metadata for each GOP (Group Of Pictures) is offered (see, for example, Patent Document 1). Here, the GOP is a unit to code the moving image in the MPEG standard.

Patent Document 1: Japanese Patent Application Laid-open No. 2006-186913

SUMMARY OF INVENTION

Problem to be Solved by the Invention

In the above-mentioned technology in related art, the metadata containing the position information is multiplexed at regular intervals, and thus many pieces of position information are scattered in the moving image file. For that reason, in the case where a user intends to invalidate all the position information in the moving image file, it is necessary for the apparatus to analyze the entire moving image file and sequentially invalidate the position information. As a result, there has been a problem that as the amount of data in the moving image file increases, it takes a longer time to perform invalidation processing on the position information.

The present technology has been made in view of such circumstances and has an object to invalidate position information multiplexed into a moving image at high speed.

Means for Solving the Problem

The present technology has been made to solve the above-mentioned problem, and according to a first aspect, there are provided an imaging apparatus, a control method for the imaging apparatus, and a program for causing a computer to execute the method, the imaging apparatus including: an imaging unit to capture a moving image containing a plurality of images in a time-series order; a position acquisition unit to acquire positions at which the plurality of images are captured; an offset calculation unit to calculate, as an offset, a difference between a reference value that is any of the positions at which the plurality of images are captured and each of the positions to associate the offset with the image whose position is acquired; and a metadata generation unit to generate, as moving image metadata that accompanies the moving image, metadata containing the reference value and generate, as image metadata that accompanies the image corresponding to the offset, metadata containing the offset, for each of the acquired positions. This produces an effect of generating the moving image metadata and the image metadata, the moving image metadata containing the reference value that is any of the positions at which the plurality of images are captured, the image metadata containing the offset that is the difference between the reference value and each of the positions.

Further, in the first aspect, the imaging apparatus may further include: a storage unit to store the moving image, the moving image metadata, and the image metadata in a storage area; and a metadata processing unit to invalidate the reference value when the moving image metadata is moved from the storage area. This produces an effect of invalidating the reference value when the moving image metadata is moved from the storage area.

Further, in the first aspect, the imaging apparatus may further include a registration unit to resister a position to be invalidated, in which the metadata processing unit may invalidate the reference value if the reference value indicates the position to be invalidated, when the moving image metadata is moved from the storage area. This produces an effect of invalidating the reference value if the reference value indicates the position to be invalidated, when the moving image metadata is moved from the storage area.

Further, in the first aspect, the imaging unit may capture a first moving image and a second moving image, the first moving image containing a plurality of first images in the time-series order, the second moving image containing a plurality of second images in the time-series order, the offset calculation unit may calculate, as a first offset, a difference between a first reference value that is any of the first positions at which the plurality of first images are captured and each of the first positions to associate the first offset with the first image whose first position is acquired, and calculate, as a second offset, a difference between a second reference value that is any of the second positions at which the plurality of second images are captured and each of the second positions to associate the second offset with the second image whose second position is acquired, and the metadata generation unit may generate, as first moving image metadata that accompanies the first moving image, metadata containing the first reference value, generate, as second moving image metadata that accompanies the second moving image, metadata containing the second reference value, generate, as first image metadata that accompanies the first image corresponding to the first offset, metadata containing the first offset, for each of the acquired first positions, and generate, as second image metadata that accompanies the second image corresponding to the second offset, metadata containing the second offset, for each of the acquired second positions. The imaging apparatus may further include a connection unit to connect the second moving image to the first moving image, associate a first address with the first reference value to add the first address to the first moving image metadata, the first address being an address of the first image metadata, and associate a second address with the second reference value to add the second address to the first moving image data, the second address being an address of the second image metadata. This produces an effect of connecting the second moving image to the first moving image and adding, to the first moving image metadata, the first address associated with the first reference value and the associated second reference value and second address.

Further, in the first aspect, the imaging apparatus may further include: a storage unit to store the first moving image, the first moving image metadata, the first image metadata, the second moving image, the second moving image metadata, and the second image metadata in a storage area; and a metadata processing unit to calculate, as a new offset, a difference between the first reference value and the second reference value, when the first moving image metadata is moved from the storage area, replace the second reference value with the new offset in the first moving image metadata, and invalidate the first reference value. This produces an effect of replacing the second reference value with the new offset and invalidating the first reference value, when the moving image metadata is moved from the storage area.

Further, in the first aspect, the imaging apparatus may further include a division unit to divide the first moving image, to which the second moving image is connected, into a third moving image and a fourth moving image, generate fourth moving image metadata that accompanies the fourth moving image and fourth image metadata that accompanies a fourth image contained in the fourth moving image, and associate the reference value and a fourth address to be added to the fourth moving image metadata, the reference value being related to the offset corresponding to the fourth image, the fourth address being an address of the fourth image metadata. This produces an effect of dividing the first moving image into the third moving image and the fourth moving image and adding the associated reference value and fourth address to the fourth moving image metadata.

Further, in the first aspect, the imaging unit may capture a first moving image and a second moving image, the first moving image containing a plurality of first images in the time-series order, the second moving image containing a plurality of second images in the time-series order, the offset calculation unit may calculate, as a first offset, a difference between a first reference value that is any of the first positions at which the plurality of first images are captured and each of the first positions to associate the first offset with the first image whose first position is acquired, and calculate, as a second offset, a difference between a second reference value that is any of the second positions at which the plurality of second images are captured and each of the second positions to associate the second offset with the second image whose second position is acquired, and the metadata generation unit may generate, as first moving image metadata that accompanies the first moving image, metadata containing the first reference value and generate, as second moving image metadata that accompanies the second moving image, metadata containing the second reference value. The imaging apparatus may further include a connection unit to connect the second moving image to the first moving image and calculate, as a new offset, a difference between the first reference value and the second reference value to add the new offset to the first moving image metadata. This produces an effect of connecting the second moving image to the first moving image and adding the new offset to the first moving image metadata.

Further, according to a second aspect of the present technology, there are provided an information processing apparatus, a control method for the information processing apparatus, and a program for causing a computer to execute the method, the information processing apparatus including: a storage unit to obtain, as moving image metadata that accompanies a moving image, metadata containing a reference value that is any of positions at which a plurality of images contained in the moving image are captured, and obtain, as image metadata that accompanies the image corresponding to an offset, metadata containing the offset that is a difference between the reference value and each of the positions, to store the moving image metadata, the image metadata, and the moving image in a storage area; and a metadata processing unit to invalidate the reference value when the moving image metadata is moved from the storage area. This produces an effect of invalidating the reference value when the moving image metadata is moved from the storage area.

Further, according to a second aspect of the present technology, there are provided an information processing apparatus, a control method for the information processing apparatus, and a program for causing a computer to execute the method, the information processing apparatus including: a storage unit to obtain, as first moving image metadata that accompanies a first moving image, metadata containing a first reference value that is any of first positions at which a plurality of first images contained in the first moving image are captured, obtain, as first image metadata that accompanies the first image corresponding to a first offset, metadata containing the first offset that is a difference between the first reference value and each of the first positions, obtain, as second moving image metadata that accompanies a second moving image, metadata containing a second reference value that is any of second positions at which a plurality of second images contained in the second moving image are captured, and obtain, as second image metadata that accompanies the second image corresponding to a second offset, metadata containing the second offset that is a difference between the second reference value and each of the second positions, to store the first moving image metadata, the first image metadata, the first moving image, the second moving image metadata, the second image metadata, and the second moving image; and a connection unit to connect the second moving image to the first moving image and calculate, as a new offset, a difference between the first reference value and the second reference value to add the new offset to the first moving image metadata. This produces an effect of connecting the second moving image to the first moving image and adding the new offset to the first moving image metadata.

Effect of the Invention

According to the present technology, it is possible to produce an excellent effect of allowing position information multiplexed into a moving image to be invalidated at high speed.

BRIEF DESCRIPTION OF DRAWINGS

FIG. 6 A diagram showing an example of a data structure of image metadata in the first embodiment.

FIG. 7 A diagram showing an example of position information that is acquired in a time-series order in the first embodiment.

FIG. 8 A diagram showing an example of a reference value and an offset in the first embodiment.

FIG. 15 An example of a reference value stored in a clip information file in the second embodiment.

FIG. 17 An example of a data structure of an MDVP (Modified Digital Video Pack) in the second embodiment.

FIG. 18 An example of a field provided in the MDVP in the second embodiment.

FIG. 19 A diagram showing an example of an offset in the moving image file in the second embodiment.

FIG. 25 A diagram showing an example of a reference value and an offset in a clip information file in the third embodiment.

FIG. 28 A diagram showing an example of a reference value and an offset after connection in the second modified example.

FIG. 34 A diagram showing an example of a reference value in the fifth embodiment.

FIG. 35 A diagram showing an example of an offset in the fifth embodiment.

MODES FOR CARRYING OUT THE INVENTION

Hereinafter, embodiments for carrying out the present technology (hereinafter, referred to as embodiments) will be described.

Description will be given in the following order.

1. First Embodiment (Imaging Processing: Example of Multiplexing Reference Value and Offset)
2. Second Embodiment (Moving Image Editing Processing: Example of Connecting Moving Image Files)
3. Third Embodiment (Moving Image Editing Processing: Example of Updating Reference Value to Be Offset at Time of Connection)
4. Fourth Embodiment (Imaging Processing: Example of Invalidating Only Registered Position Information)
5. Fifth Embodiment (Moving Image Editing Processing: Example of Dividing Moving Image File)

1. First Embodiment

Configuration Example of Information Processing System

Figure 1:
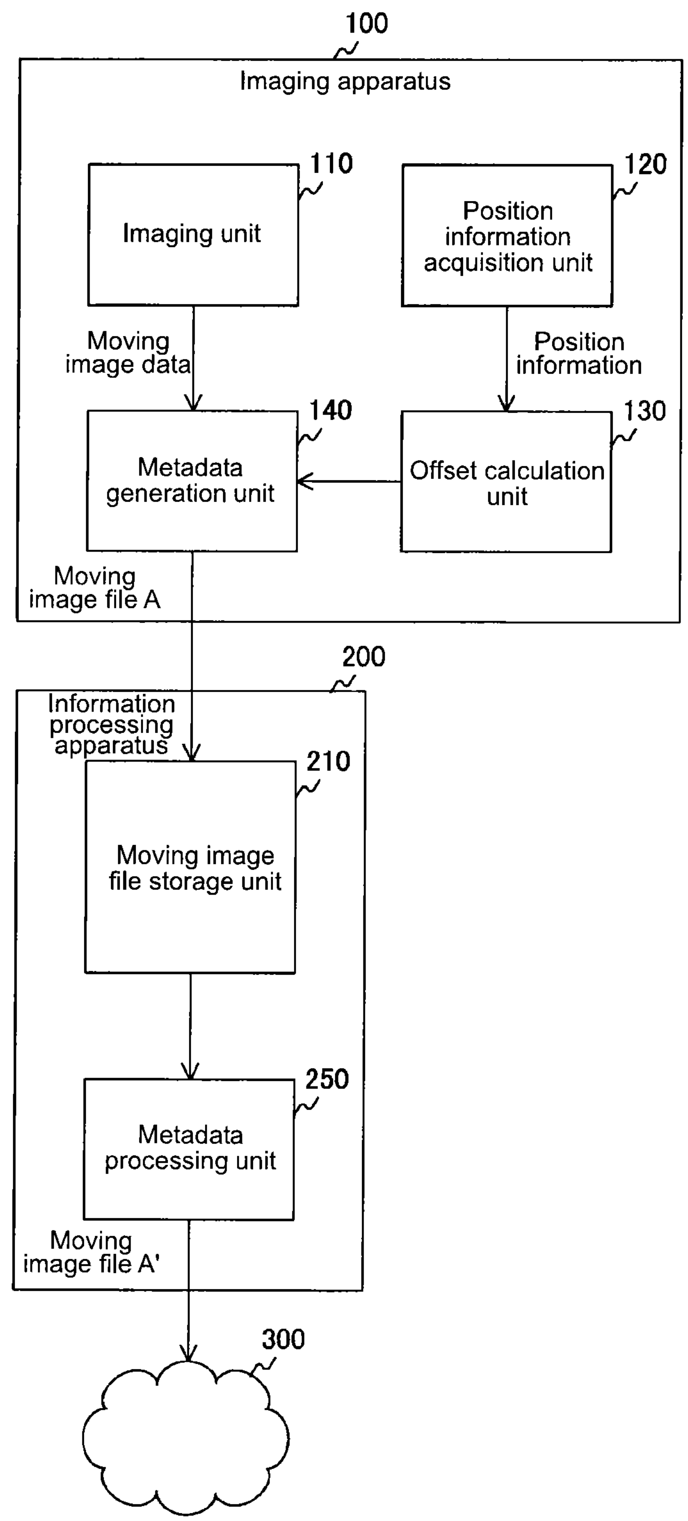
FIG. 1 A block diagram showing an example of an information processing system in a first embodiment.

FIG. 1 is a block diagram showing one configuration example of an information processing system in a first embodiment. The information processing system is a system that generates moving image data into which metadata is multiplexed and that processes the metadata. The information processing system includes an imaging apparatus 100 and an information processing apparatus 200.

The imaging apparatus 100 captures a moving image. The imaging apparatus 100 includes an imaging unit 110, a position information acquisition unit 120, an offset calculation unit 130, and a metadata generation unit 140.

The imaging unit 110 captures a moving image and generates moving image data. The imaging unit 110 codes the generated moving image data as necessary. When coding the moving image data, the imaging unit 110 performs coding by using a coding system conforming to an MPEG2-PS (Program Stream) standard, for example. In the MPEG2-PS standard, the moving image data is coded or decoded by a unit called GOP (Group Of Pictures). The GOP is an aggregate of images including at least one image (hereinafter, referred to as "I (Intra) picture") that is to be a reference in coding. The imaging unit 110 outputs the moving image data to the metadata generation unit 140.

The position information acquisition unit 120 acquires position information of positions at which a plurality of images in the moving image are captured.

The position information acquisition unit 120 acquires, for example, position information of a position at which any I picture in a GOP is captured. In general, the GOP forms a moving image for about 0.5 seconds and thus in the case where each GOP has one I picture, the position information is acquired by about 0.5 seconds. The position information acquisition unit 120 outputs the acquired position information to the offset calculation unit 130.

The offset calculation unit 130 obtains, as a positional reference value, any of the acquired positions and calculates an offset that is a difference between the reference value and each of the positions. The offset calculation unit 130 sets the position, which has been first acquired, as a reference value, for example. The offset calculation unit 130 associates each offset with an image whose position has been acquired, and outputs the offset to the metadata generation unit 140 together with the reference value.

The metadata generation unit 140 generates moving image metadata and image metadata. The moving image metadata is data that accompanies the moving image. In the moving image metadata, the positional reference value is stored. Further, the image metadata is data that accompanies an image whose offset has been calculated based on the position where the image has been captured. The offset is stored in the image metadata. The metadata generation unit 140 multiplexes the moving image metadata and the image metadata into the moving image data. The metadata generation unit 140 outputs, as a moving image file, the moving image data, into which the moving image metadata and the image metadata have been multiplexed, to the information processing apparatus 200.

The information processing apparatus 200 processes the metadata that have been multiplexed into moving image data.

The information processing apparatus 200 includes a moving image file storage unit 210 and a metadata processing unit 250.

The moving image file storage unit 210 includes a storage area and stores a moving image file in the storage area. When the moving image metadata is moved from the storage area, the metadata processing unit 250 invalidates a positional reference value in the moving image metadata. For example, in the case where the moving image file is uploaded over a network 300 or a new moving image file for uploading is generated, or in the case where a moving image file is replicated, the moving image metadata in the moving image file is moved from the storage area. When the reference value is invalidated, the metadata processing unit 250 sets 1 for all of bits in a bit row of the data indicating the reference value, for example.

It should be noted that the position information acquisition unit 120 is an example of a position acquisition unit described in the section "Claims". Further, the moving image file storage unit 210 is an example of a storage unit described in the section "Claims".

Figure 2:
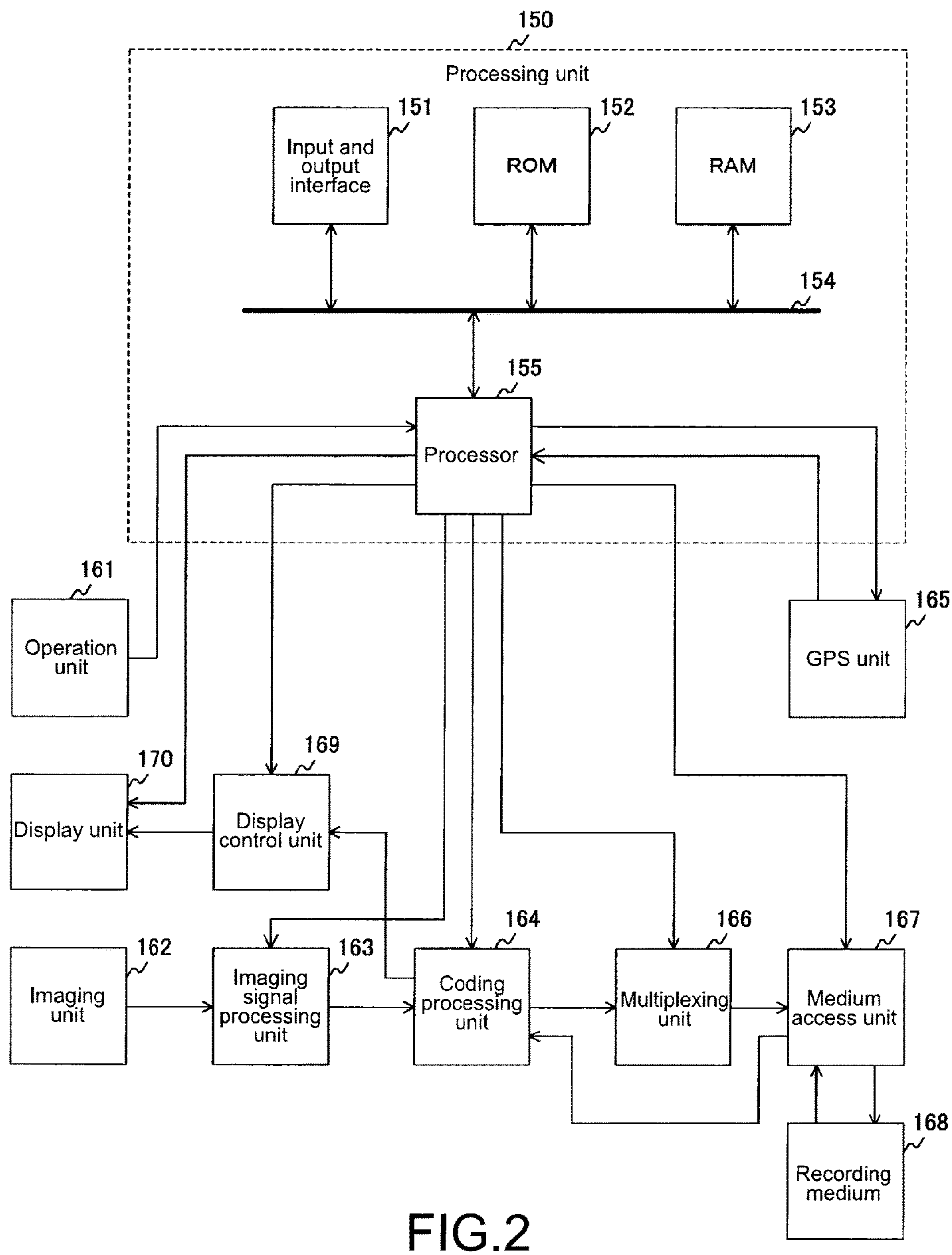
FIG. 2 A block diagram showing one configuration example of an imaging apparatus in the first embodiment.

FIG. 2 is a block diagram showing a specific configuration example of the imaging apparatus 100. The imaging apparatus 100 includes a processing unit 150, an operation unit 161, an imaging unit 162, an imaging signal processing unit 163, a coding processing unit 164, a GPS unit 165, a multiplexing unit 166, a medium access unit 167, a recording medium 168, a display control unit 169, and a display unit 170.

The processing unit 150 executes processing for generating a moving image file. The processing unit 150 includes an input and output interface 151, a ROM (Read Only Memory) 152, and a RAM (Random Access Memory) 153. Further, the processing unit 150 includes a bus 154 and a processor 155.

The input and output interface 151 outputs data, which has been input from the outside of the processing unit 150, to the processor 155 via the bus 154, and receives data from the processor 155 and outputs the data to the outside of the processing unit 150.

The ROM 152 stores various programs to be executed by the processor 155, predetermined parameters to be used when those programs are executed, and the like.

The RAM 153 temporarily stores data to be processed by the processor 155, working data during the execution of the programs, and the like.

The bus 154 is a common path for exchanging data among the input and output interface 151, the ROM 152, the RAM 153, and the processor 155.

The processor 155 executes various programs and controls the whole of the imaging apparatus 100.

The operation unit 161 acquires an operation signal with which the imaging apparatus 100 is operated. The operation unit 161 outputs the operation signal to the processing unit 150.

The imaging unit 162 captures a plurality of images in a time-series order. Specifically, the imaging unit 162 focuses light from an optical system on a light-receiving surface of an imaging device to form an image and converts the formed image into analog electrical signals. The imaging unit 162 outputs the electrical signals, which serve as imaging signals, to the imaging signal processing unit 163.

The imaging signal processing unit 163 processes imaging signals. Specifically, the imaging signal processing unit 163 executes A/D (Analog/Digital) conversion processing that converts imaging signals into digital electrical signals, color separation processing that separates electrical signals into signals with respective colors of RGB (Red, Green, and Blue), gamma conversion processing, and the like. The imaging signal processing unit 163 outputs the processed electrical signals to the coding processing unit 164.

The coding processing unit 164 codes data included in the electrical signals from the imaging signal processing unit 163 and decodes data from the medium access unit 167. The coding processing unit 164 performs coding processing or decoding processing conforming to the MPEG2-PS standard, for example. The coding processing unit 164 outputs the coded data to the multiplexing unit 166 and electrical signals including the decoded data to the display control unit 169.

The GPS unit 165 acquires position information of positions at which a plurality of images in the moving image are captured. For example, the GPS unit 165 receives signals from a plurality of GPS satellites and determines, based on those signals, the position of the imaging apparatus 100 when images are captured. Specifically, a latitude and a longitude are determined as the position. The GPS unit 165 can further determine an altitude at the time when images are captured, and the like. The GPS unit 165 outputs the position information of the determined position to the processing unit 150.

The multiplexing unit 166 multiplexes metadata into moving image data. Specifically, the multiplexing unit 166 stores the positional reference value in the moving image metadata and stores the offset in the image metadata, to multiplex those pieces of metadata into the moving image data. Further, the multiplexing unit 166 can further multiplex audio data into the moving image data as necessary. The multiplexing unit 166 outputs, as a moving image file, the moving image data into which the offset and the like are multiplexed, to the medium access unit 167.

The medium access unit 167 accesses the recording medium 168 to write the moving image file in the recording medium 168 or reads out the moving image file from the recording medium 168. The medium access unit 167 outputs the read-out moving image file to the coding processing unit 164.

The recording medium 168 records the moving image file. As the recording medium 168, a flash memory, an HDD (Hard Disk Drive), or the like is used.

The display control unit 169 controls the display unit 170 to display a moving image. The display control unit 169 outputs the electrical signals, which include the data from the coding processing unit 164, to the display unit 170 and controls the display unit 170 to display the moving image. The display unit 170 displays the moving image according to the control of the display control unit 169.

The imaging unit 110 exemplified in FIG. 1 is achieved by the processing unit 150, the imaging unit 162, the imaging signal processing unit 163, the coding processing unit 164, and the like exemplified in FIG. 2. The position information acquisition unit 120 exemplified in FIG. 1 is achieved by the processing unit 150, the GPS unit 165, and the like exemplified in FIG. 2. The offset calculation unit 130 exemplified in FIG. 1 is achieved by the processing unit 150 and the like exemplified in FIG. 2. The metadata generation unit 140 exemplified in FIG. 1 is achieved by the processing unit 150, the multiplexing unit 166, and the like exemplified in FIG. 2.

Figure 3:
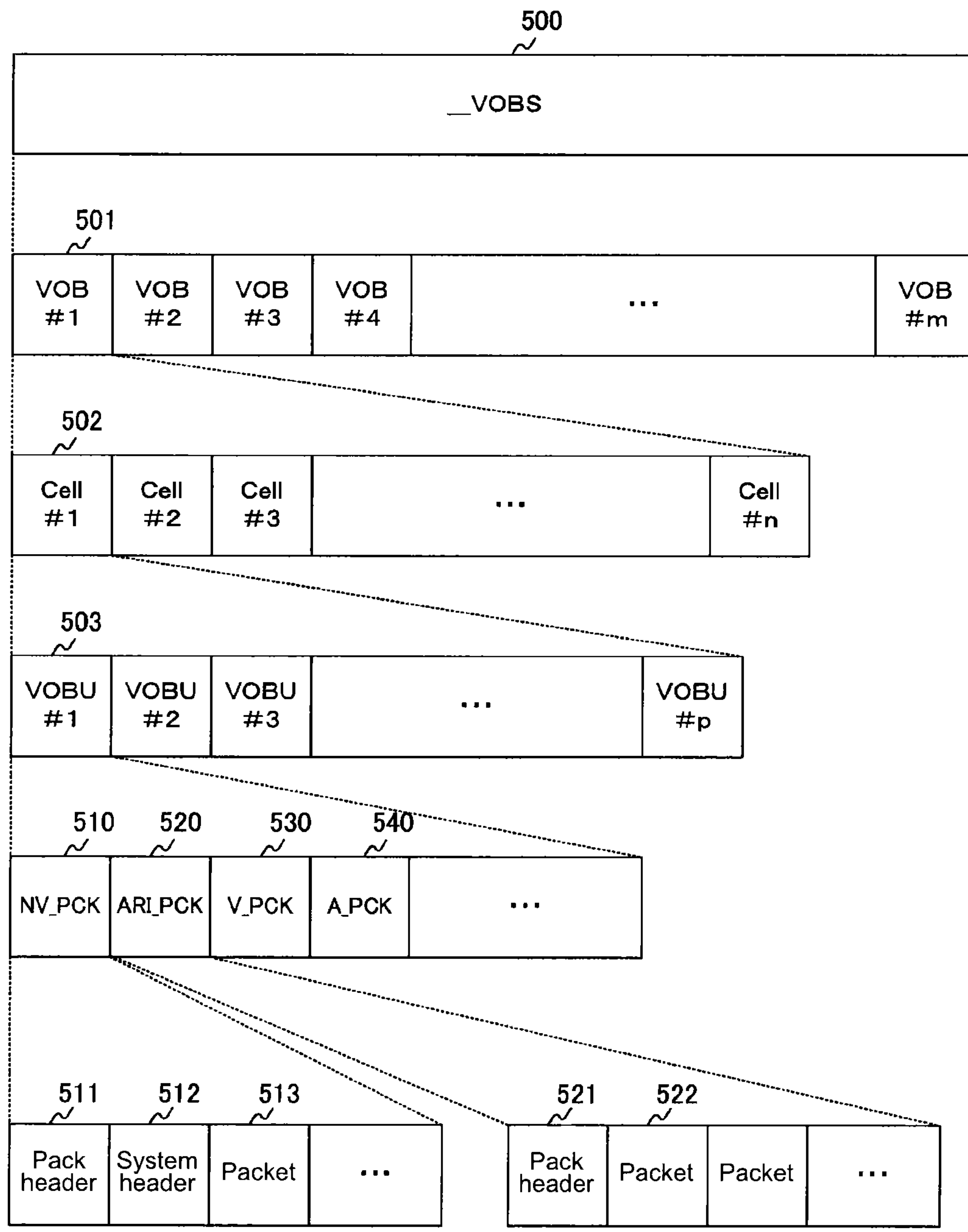
FIG. 3 A diagram showing one configuration example of a moving image file in the first embodiment.

FIG. 3 is a diagram showing an example of a data structure of a moving image file conforming to an MPEG2-PS format in the first embodiment. The moving image file includes a video object set (VOBS) 500 that is moving image data. The VOBS 500 is an aggregate of one or more video objects (VOB) 501. The VOB 501 is constituted of one or more cells 502. The cell 502 includes one or more video object units (VOBU) 503. The VOBU 503 is a pack row including a navigation pack (NV_PCK) 510 at the head. The pack refers to fixed data of 2048 bytes. The VOBU 503 includes, in addition to the NV_PCK 510 at the head, an additional recording information pack (ARI_PCK) 520, a video pack (V_PCK) 530 that holds the moving image data, an audio pack (A_PCK) 540 that holds audio data, and the like as necessary.

Each of the packs includes a pack header and packets. The NV_PCK 510 at the head further includes a system header 512 in addition to a pack header 511 and packets 513. The pack header 511 stores information related to the packs, such as a start code of a pack and an identification code of the MPEG2-PS. The system header 512 includes moving image metadata that accompanies the moving image, such as a bit rate and the number of audio channels. In addition to the bit rate and the like, a reference value is stored in the moving image metadata.

The ARI_PCK 520 includes a pack header 521 and packets 522. The packet 522 includes image metadata that accompanies an image, such as a day and time at which the image is captured, and imaging conditions. An offset that corresponds to the image is stored in the image metadata, in addition to the day and time at which the image is captured, and the like.

Figure 4:
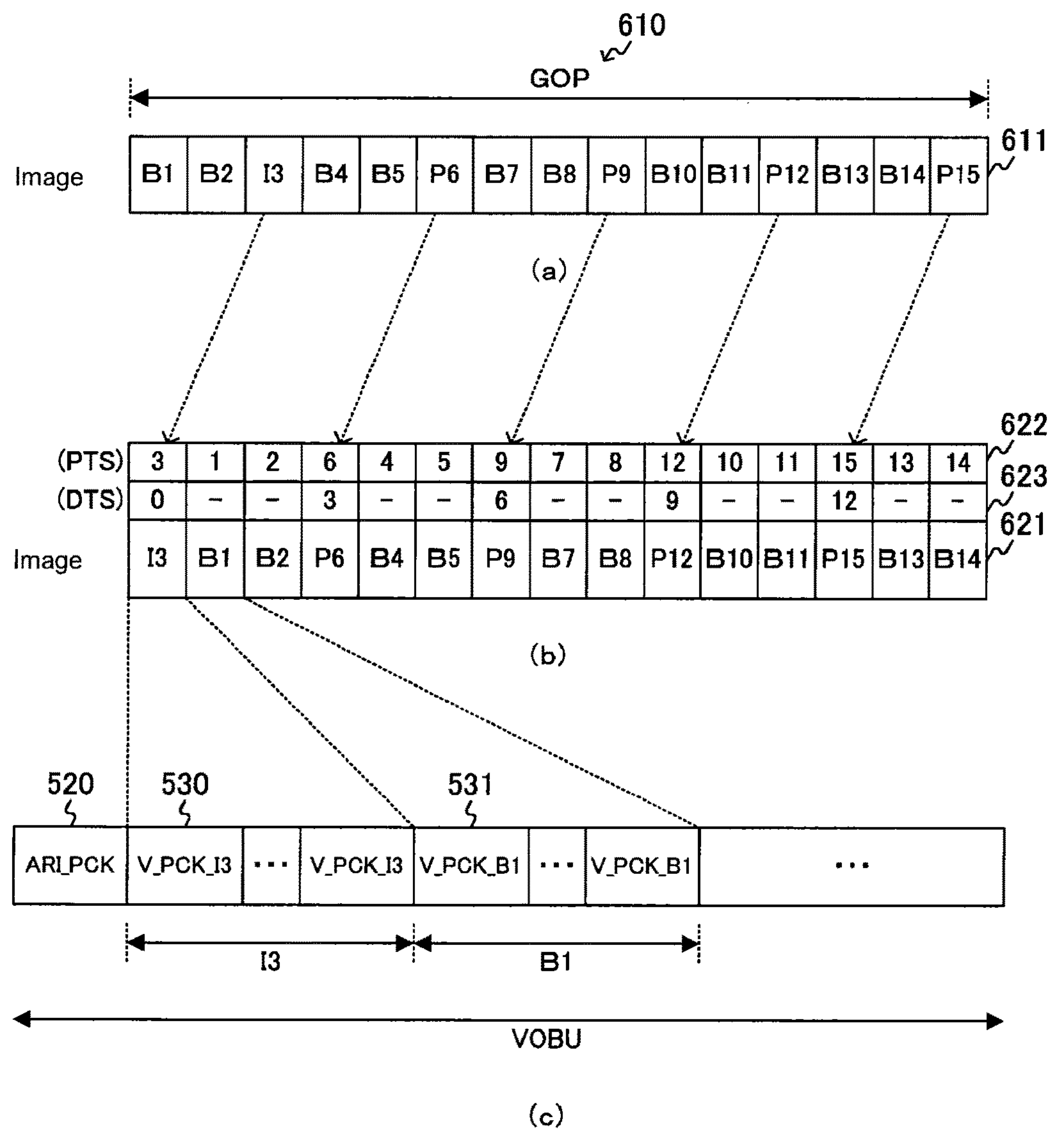
FIG. 4 A diagram showing a relationship between a video object unit and images in a GOP in the first embodiment.

FIG. 4 is a diagram showing a relationship between a video object unit (VOBU) and images in a GOP in the first embodiment. FIG. 4(*a*) shows a state where a total of fifteen images 611 including one I picture, four P (Predirective) pictures, and ten B (Bidirectionally predictive) pictures form a GOP 610. Here, the I picture is an image that is a reference in coding. The P picture is an image to be coded by using a difference from a temporally preceding I picture or P picture. The B picture is an image to be coded by using a difference from an I picture or P picture that is located in a temporally forward or backward direction.

Some of the fifteen images in the GOP are rearranged in order to be recorded on the recording medium 168 as shown in FIG. 4(*b*). This is based on the features of the coding system in the MPEG standard and is for avoiding waiting for a temporally subsequent image at the time of decoding. For example, to decode a B picture (B5), it is necessary to refer to an I picture (I3) and a P picture (P6). For that reason, a rearrangement as shown in FIG. 4(*b*) should be performed so as to prepare necessary image data (I3 and P6) at the time when the B picture (B5) is decoded. It should be noted that in order to define an order relation of such images 521, time stamps of PTS (Presentation Time Stamp) 622 and DTS (Decoding Time Stamp) 623 are given in the pack header of the V_PCK. The PTS 622 is time management information on reproduction and output and indicates when a unit image provided with the time stamp is reproduced and output. In contrast, the DTS 623 is time management information on decoding and indicates when the unit image provided with the time stamp is decoded.

As exemplified in FIG. 4(*c*), the coded images are each put in one or more packs. For example, the I picture (I3) is held as a V_PCK_I3 (530), and a B picture (B1) is held as a V_PCK_B1 (531). Additionally, the ARI_PCK 520 and the A_PCK 520 are multiplexed into an aggregate of the V_PCKs 530 that form one GOP 610. The multiplexed pack group forms the VOBU.

Figure 5:
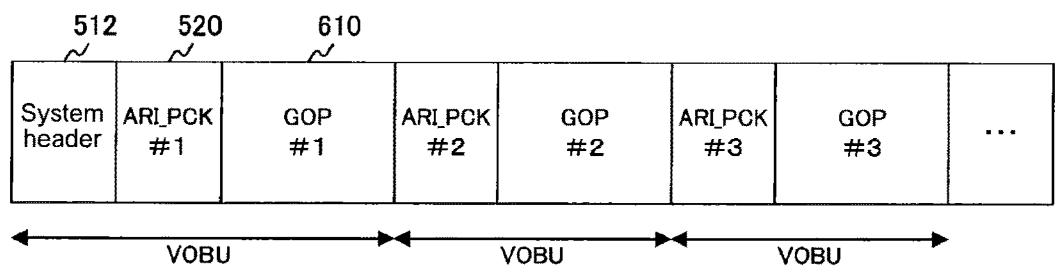
FIG. 5 A diagram showing an example of a position at which a reference value and an offset are added in the first embodiment.

FIG. 5 is a diagram showing an example of a position at which each of a positional reference value and an offset is added in the moving image file. The VOBU at the head of the moving image file includes the system header 512 in which the reference value is stored. Further, between the system header 512 and the first GOP 610, the ARI_PCK 520 that accompanies the GOP 610 is inserted. In each of the second and subsequent VOBUs, an ARI_PCK that accompanies a GOP in the VOBU is arranged at the head, and the GOP is subsequently arranged. Each ARI_PCK 520 stores an offset. As exemplified in FIG. 5, in the case where the ARI_PCK 520 including an offset for each GOP is added, the offsets are arrayed in a time-series order in the moving image file.

FIG. 6 is a diagram showing an example of a data structure of the image metadata in the first embodiment. The image metadata in packets within the ARI_PCK 520 includes four types of data, an additional recording information identifier, application information, recording time information, and camera information.

The additional recording identifier is an identifier that is given to image metadata additionally recorded, and an additional recording information data identifier (ARI_DAT_ID) and its version number (ARI_DAT_VER) are recorded.

The application information includes a vender name (VND_NAME) that is a manufacturer of a product, a product name (PRD_NAME) that is the name of a product, an application identifier (APL_ID), a manufacturer information data (MNFI_DATA), and a device type (PRD_TYP).

In the recording time information, a time zone at the time of the recording of the image metadata (VOBU_LCL_TM_ZONE) and a recording time of an I picture corresponding to the image metadata (VOBU_REC_TM) are recorded. The time zone is a time difference between the standard time and a time of a country where the imaging apparatus 100 is used (local time). In the VOBU_REC_TM, for example, a date and time at which the I picture is captured is described in year, month, day, hour, minute, and second.

The camera information is information that indicates setting conditions at the time when images are captured, and the like. Specifically, the camera information includes reserved information (Reserved), in addition to information such as an F number (F_NUM), an exposure time (EXP_TM), an exposure program (EXP_PRG), and an exposure correction value (EXP_BIS_VAL).

In the reserved information (Reserved), an offset (Offset_Info) is stored. The offset is a difference between a reference value and a position at which the I picture corresponding to the image metadata is captured.

FIG. 7 is a diagram showing an example of the position information that is acquired in the time-series order in the first embodiment. At a time when the I picture in each GOP is captured, the position information indicating a latitude and a longitude of the position at which the I picture is captured is acquired. For example, at a "time#1" in a certain GOP, the position information indicating a latitude of "35.681382" and a longitude of "139.766084" is acquired. At a "time#2" in a subsequent GOP, the position information indicating a latitude of "35.681383" and a longitude of "139.766082" is acquired. Subsequently, the position information for each GOP is acquired.

FIG. 8 is a diagram showing an example of a positional reference value and an offset in the first embodiment. As exemplified in FIG. 8(*a*), the position that has been acquired first (latitude of "35.681382" and longitude of "139.766084") is stored as a reference value in the system header 512. Further, as exemplified in FIG. 8(*b*), an offset is stored in an ARI_PCK to be multiplexed into each GOP. For example, since the position at which the I picture of the first GOP is captured is the reference value, an "ARI_PCK#1" to be multiplexed into that GOP stores a latitude of "±0.000000" and a longitude of "±0.000000", which serve as an offset. In an "ARI_PCK#2" to be added to the next GOP, a difference between the reference value and a position at which an I picture of that GOP is captured (latitude of "+0.000001" and longitude of "−0.000002") is stored as an offset. Subsequently, an ARI_PCK to be added to each GOP stores an offset from the reference value.

Operation Example of Imaging Apparatus

Figure 9:
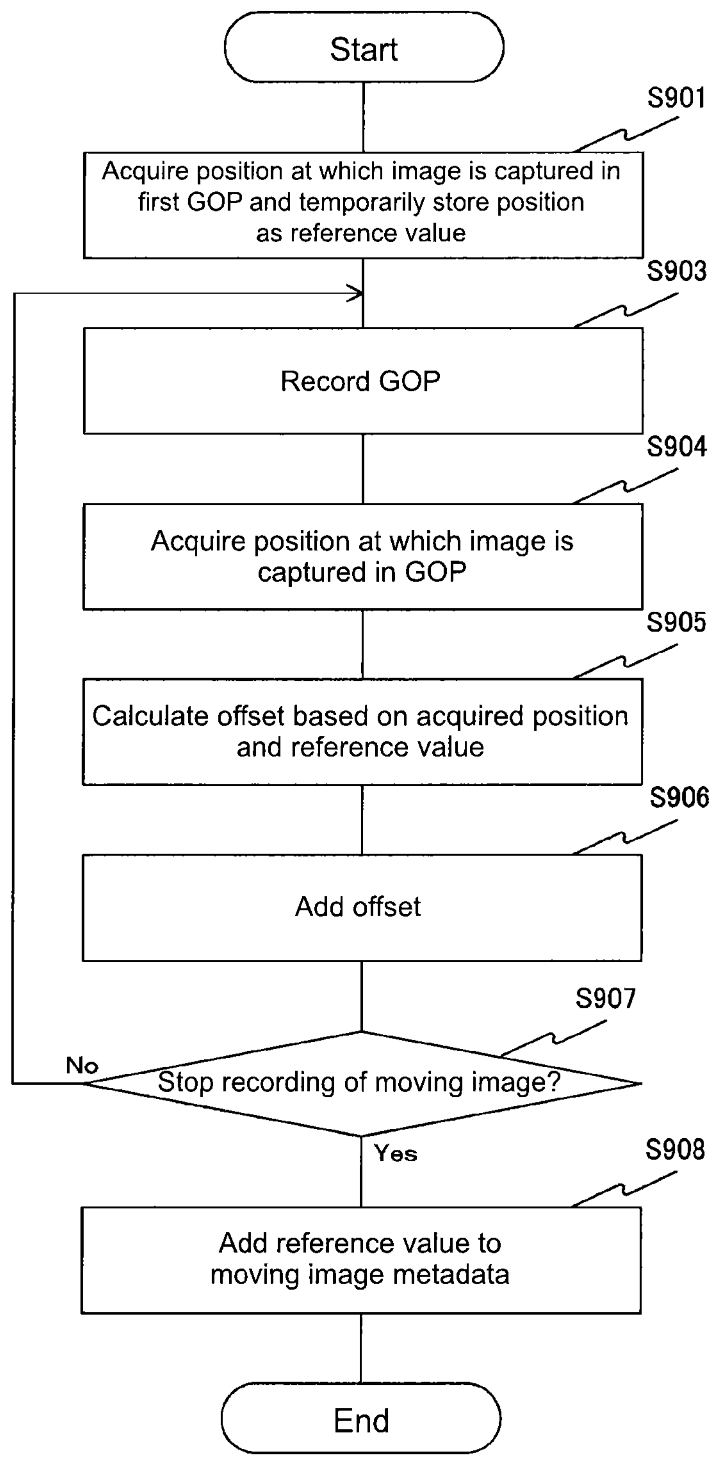
FIG. 9 A flowchart showing an example of an operation of the imaging apparatus in the first embodiment.

FIG. 9 is a flowchart showing an example of an operation of the imaging apparatus 100 in the first embodiment. The operation is started when an instruction to start the recording of a moving image is given. The imaging apparatus 100 acquires a position, at which an image is captured, in the first GOP and temporarily stores the position as a reference value (Step S901).

The imaging apparatus 100 records the next GOP (Step S903) and acquires a position, at which an image is captured, in the GOP (Step S904). The imaging apparatus 100 calculates an offset based on that position at which the image is captured and the reference value (Step S905). The imaging apparatus 100 adds image metadata, which contains the offset, to the GOP (Step S906).

The imaging apparatus 100 determines whether an instruction to stop the recording of the moving image is given (Step S907). In the case where an instruction to stop the recording of the moving image is not given (Step S907: No), the imaging apparatus 100 returns to Step S903. In the case where an instruction to stop the recording of the moving image is given (Step S907: Yes), the imaging apparatus 100 adds the temporarily stored reference value to the moving image metadata (Step S908). After Step S908, the imaging apparatus 100 terminates the operation of capturing the moving image.

Operation Example of Information Processing Apparatus

Figure 10:
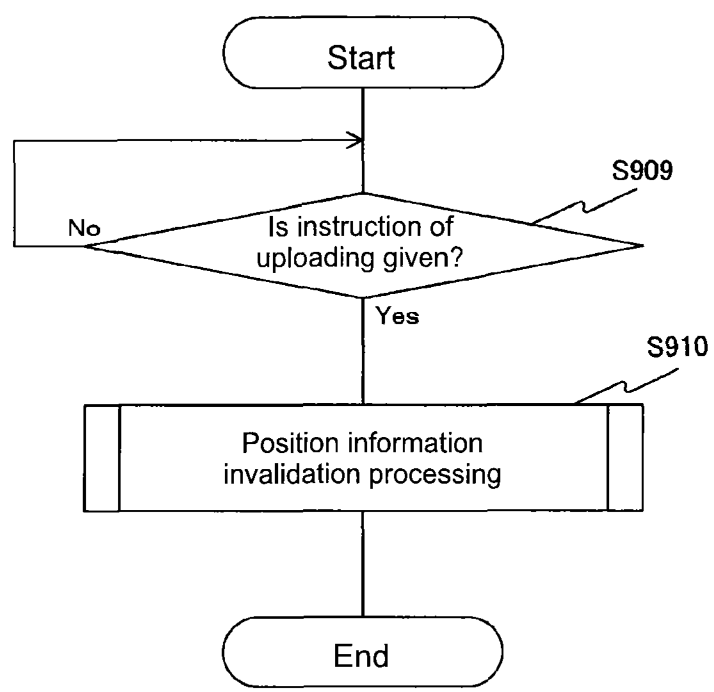
FIG. 10 A flowchart showing an example of an operation of an information processing apparatus in the first embodiment.

FIG. 10 is a flowchart showing an example of an operation of the information processing apparatus 200 in the first embodiment. This operation is started when a program for uploading a moving image file is executed, for example. The information processing apparatus 200 determines whether an instruction to upload a moving image file is given (Step S909). In the case where an instruction to upload a moving image file is not given (Step S909: No), the information processing apparatus 200 returns to Step S909. In the case where an instruction to upload a moving image file is given (Step S909: Yes), the information processing apparatus 200 executes position information invalidation processing for invalidating the position information (Step S910). After Step S910, the information processing apparatus 200 terminates the operation for uploading.

Figure 11:
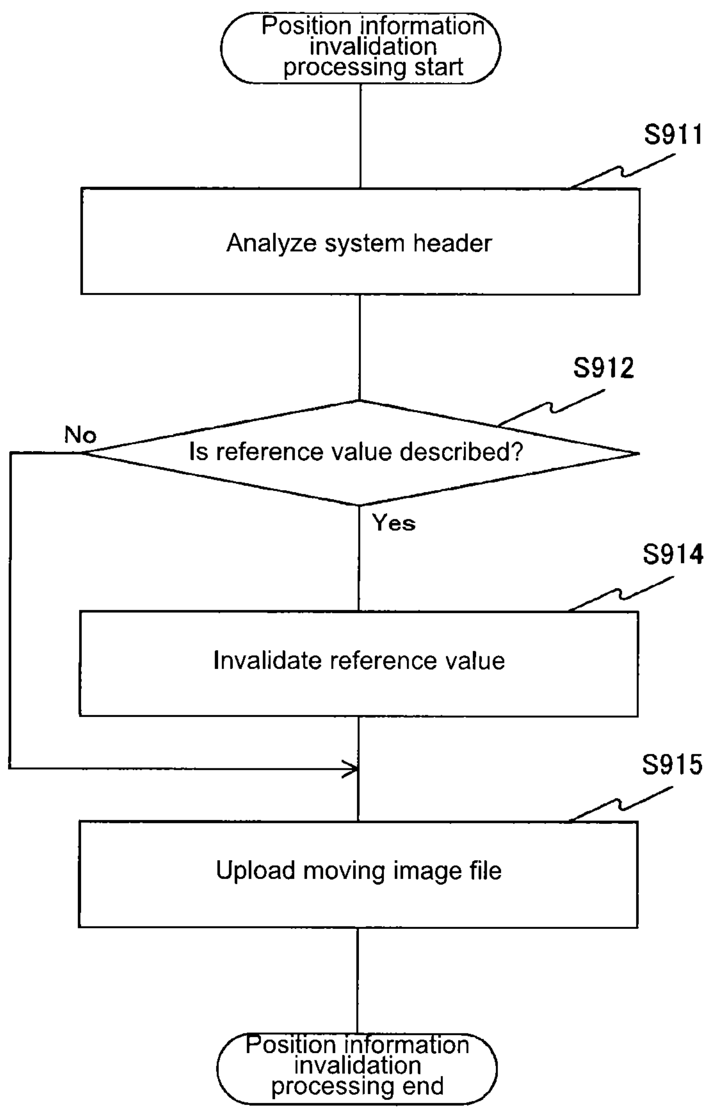
FIG. 11 A flowchart showing an example of position information invalidation processing in the first embodiment.

FIG. 11 is a flowchart showing an example of the position information invalidation processing in the first embodiment. The information processing apparatus 200 analyzes the system header in the moving image file (Step S911). The information processing apparatus 200 determines whether a positional reference value is described in the system header (Step S912). If a positional reference value is described (Step S912: Yes), the information processing apparatus 200 invalidates the reference value (Step S914). If a positional reference value is not described (Step S912: No) or after Step S914 is performed, the information processing apparatus 200 uploads a moving image file (Step S915). After Step S915, the information processing apparatus 200 terminates the position information invalidation processing.

As described above, according to the first embodiment, the imaging apparatus 100 calculates the offset from the positional reference value for each of the positions at which the plurality of images in the moving image are captured, and generates the moving image metadata containing the reference value and the image metadata containing the offset. Subsequently, the information processing apparatus 200 invalidates the reference value when the moving image metadata is moved. The reference value is invalidated, and thus an absolute position at which each image is captured cannot be obtained based on the offset, so that all of the absolute positions are invalidated. This can invalidate the position information at higher speed than the case where the information processing apparatus 200 stores the position information itself in the image metadata.

Further, if the reference value is invalidated, the offset is left in the moving image file. Thus, based on the offset, an information processing apparatus that acquires the moving image file can reproduce a track of a position at which an image is captured with the imaging apparatus 100.

It should be noted that the imaging apparatus 100 and the information processing apparatus 200 are different apparatuses, but the apparatuses 100 and 200 can be configured to be integrated as a single apparatus. The same holds true for the apparatuses in the embodiments to be described later.

Further, the imaging unit 110 codes the moving image data in the system conforming to the MPEG2-PS standard, but the moving image data may be coded in a system other than the system conforming to the MPEG2-PS standard. Furthermore, the imaging unit 110 can record the moving image data without coding.

Further, although the position information acquisition unit 120 acquires position information for each GOP corresponding to about 0.5 seconds, the position information can be acquired at other intervals. For example, the position information acquisition unit 120 may acquire the position information by about 1 second (two GOPs).

Further, although the metadata generation unit 140 stores the offset in the reserved information (Reserved), the offset can be stored in data other than the reserved information (Reserved) in the image metadata that accompanies the image.

Further, although the metadata processing unit 250 sets all of the bits to 1 to be invalidated in a bit string of data indicating the positional reference value, the reference value can be invalidated by a method other than the above. For example, the metadata processing unit 250 can also set all of the bits to 0 to be invalidated in the bit string of data indicating the reference value. Further, the image metadata can further contain a valid flag indicating whether the reference value is valid, and the metadata processing unit 250 can also update the valid flag to have a value indicating that the reference value is invalid, without deleing the reference value. As a result, the reference value is invalidated.

Further, although the metadata generation unit 140 adds the image metadata that stores the offset to the head of the GOP, the metadata generation unit 140 can add the image metadata to another part. For example, the metadata generation unit 140 can add the image metadata to the end of the moving image data, to the end of the GOP.

First Modified Example

Figure 12:
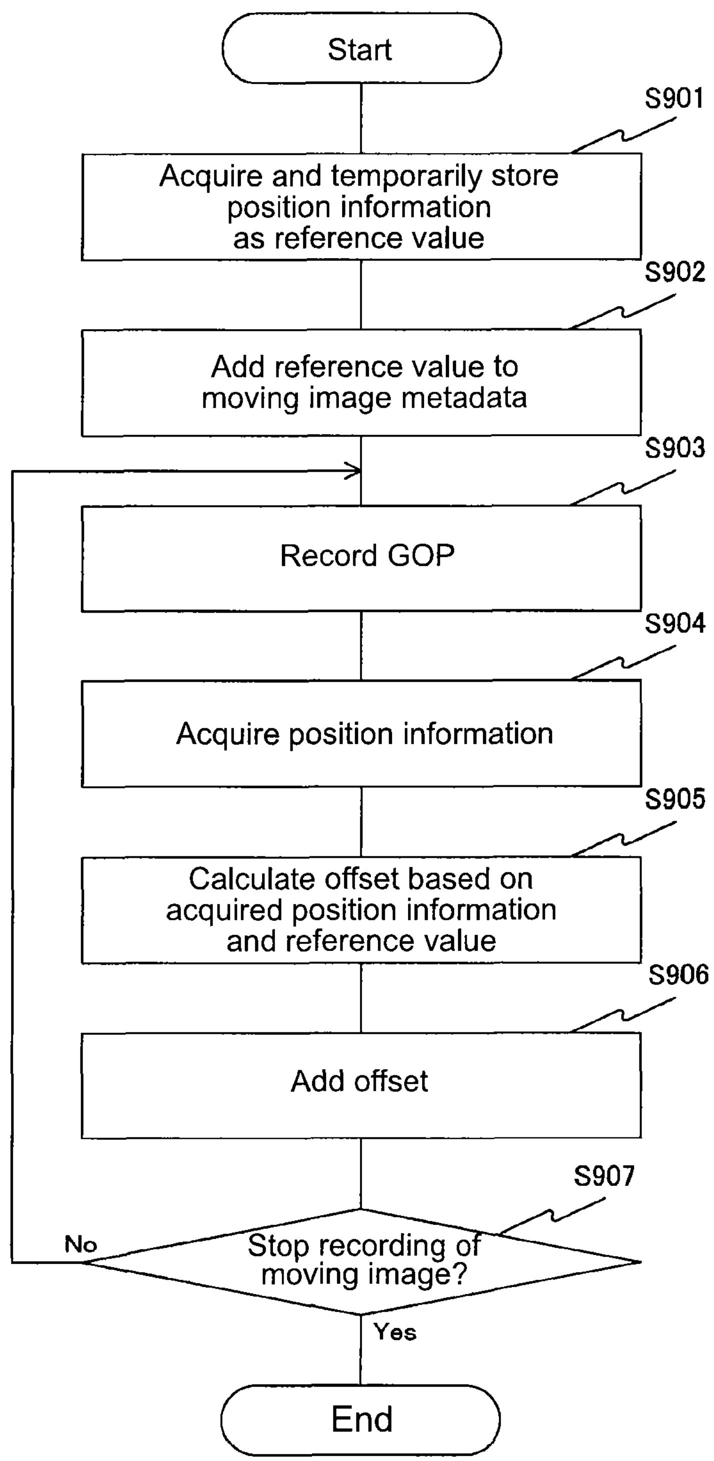
FIG. 12 A flowchart showing an example of an operation of an imaging apparatus in a first modified example.

FIG. 12 is a flowchart showing an example of an operation of an imaging apparatus 100 in a first modified example. The imaging apparatus 100 in the first embodiment adds the reference value to the moving image metadata after the recording of the moving image is stopped. In contrast to this, the imaging apparatus 100 in the first modified example is different from the imaging apparatus 100 in the first embodiment in that the reference value is added to the moving image metadata before the recording of the moving image is stopped. Specifically, the operation of the imaging apparatus 100 in the first modified example is different from the operation of the imaging apparatus 100 in the first embodiment in that Step S902 is executed instead of Step S908. The imaging apparatus 100 in the first modified example temporarily stores the reference value (Step S901) and then adds the reference value to the moving image metadata (Step S902). Subsequently, the imaging apparatus 100 records the GOP (Step S903). In such a manner, according to the first modified example, the imaging apparatus 100 previously multiplexes the reference value into the moving image before the recording of the moving image is stopped. Consequently, also in the case where the processing after the recording of the moving image is stopped is not correctly performed due to low battery and the like, the imaging apparatus 100 can record the reference value.

2. Second Embodiment

Configuration Example of Information Processing System

Figure 13:
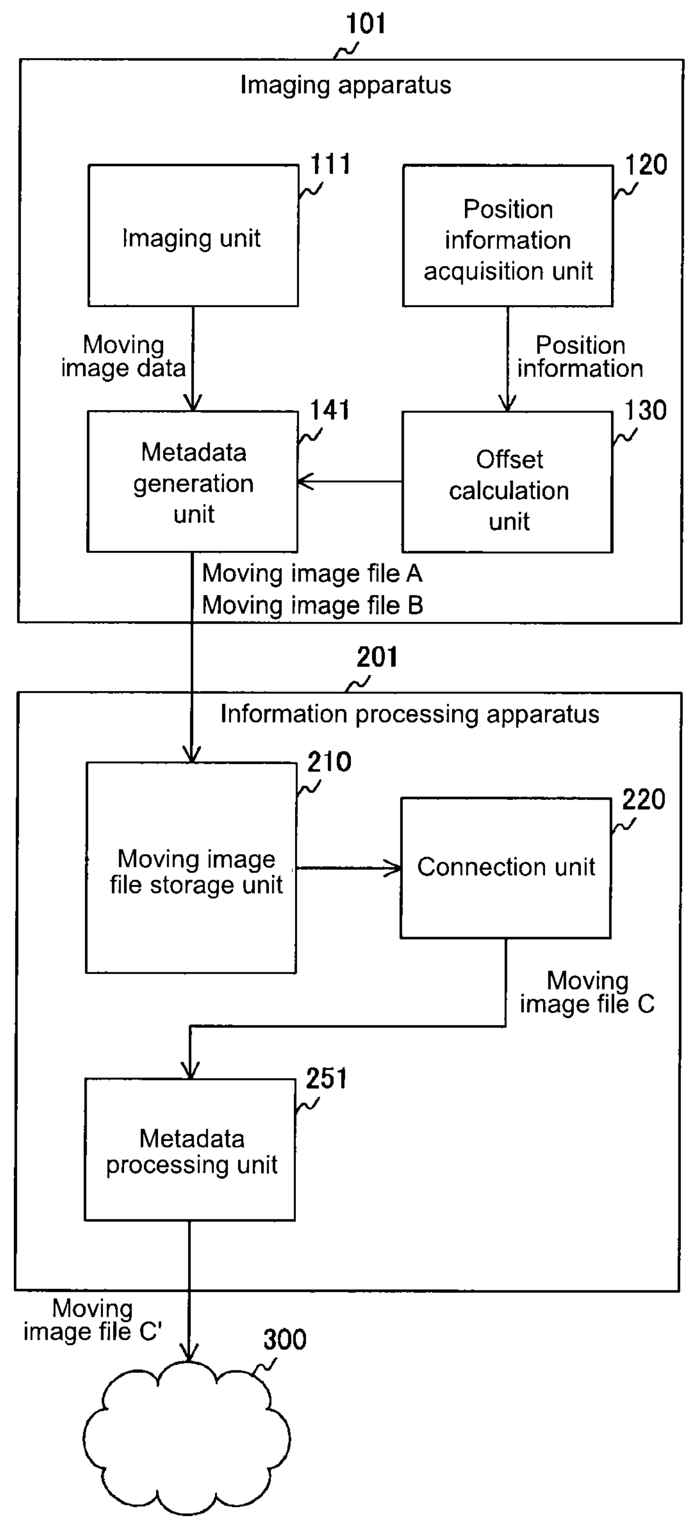
FIG. 13 A block diagram showing an example of an information processing system in a second embodiment.

FIG. 13 is a block diagram showing one configuration example of an information processing system in a second embodiment. The information processing system in the second embodiment is different from that in the first embodiment in that moving image files can be connected. Specifically, the information processing system in the second embodiment is different from the information processing system in the first embodiment in that an imaging apparatus 101 and an information processing apparatus 201 are provided instead of the imaging apparatus 100 and the information processing apparatus 200. The imaging apparatus 101 is different from the imaging apparatus 100 in the first embodiment in that an imaging unit 111 and a metadata generation unit 141 are provided instead of the imaging unit 110 and the metadata generation unit 140. The information processing apparatus 201 is different from the information processing apparatus 200 in the first embodiment in that a metadata processing unit 251 is provided instead of the metadata processing unit 250 and a connection unit 220 is further provided.

The imaging unit 111 captures moving image data and codes the moving image data in a system conforming to an AVCHD (Advanced VideoCodec High Definition) standard. The metadata generation unit 141 generates a moving image file that contains moving image metadata and image metadata and has a data structure conforming to the AVCHD standard.

The connection unit 220 connects a plurality of moving image files. Hereinafter, a moving image file serving as a connection source is referred to as a forward moving image file, and a moving image file serving as a connection destination is referred to as a backward moving image file. In FIG. 13, a moving image file A is an example of the forward moving image file, and a moving image file B is an example of the backward moving image file. A moving image file C is an example of a connected moving image file. The connection unit 220 temporarily stores a reference value of the backward moving image file and invalidates the moving image metadata of the backward moving image file. Subsequently, the connection unit 220 connects the backward moving image file to the forward moving image file. The connection unit 220 adds the reference value of the backward moving image file, which is temporarily stored, to the moving image metadata in the forward moving image file.

Further, in the case where the moving image files are connected, for an application using offsets, it is necessary to define which of offsets obtained after the connection is based on which of the reference values before the connection. In this regard, the connection unit 220 associates the reference values with offsets that are based on those respective reference values in the moving image metadata in the forward moving image file. Specifically, the connection unit 220 adds information for identifying an offset, which is based on a reference value, to the moving image metadata in association with the reference value. The information for identifying an offset are addresses in the moving image file, at which the first and last offsets among the offsets arrayed in a predetermined order are recorded. The order of array is, for example, a time-series order. Further, those addresses are relative addresses that are based on the address of the head of the moving image file. Hereinafter, an address at which the first offset is recorded is referred to as a "start address", and an address at which the last offset is recorded is referred to as an "end address". The connection unit 220 outputs the connected moving image file to the metadata processing unit 251.

The metadata processing unit 251 temporarily stores the initial reference values when the moving image files are moved and invalidates the initial reference values in the moving image metadata. Subsequently, the metadata processing unit 251 replaces the respective reference values with new offsets from the initial reference values temporarily stored. In FIG. 13, a moving image file C' is an example of the moving image file whose reference value is invalidated.

It should be noted that the forward moving image file is an example of a first moving image described in the section "Claims". Further, the backward moving image file is an example of a second moving image described in the section "Claims".

Figure 14:
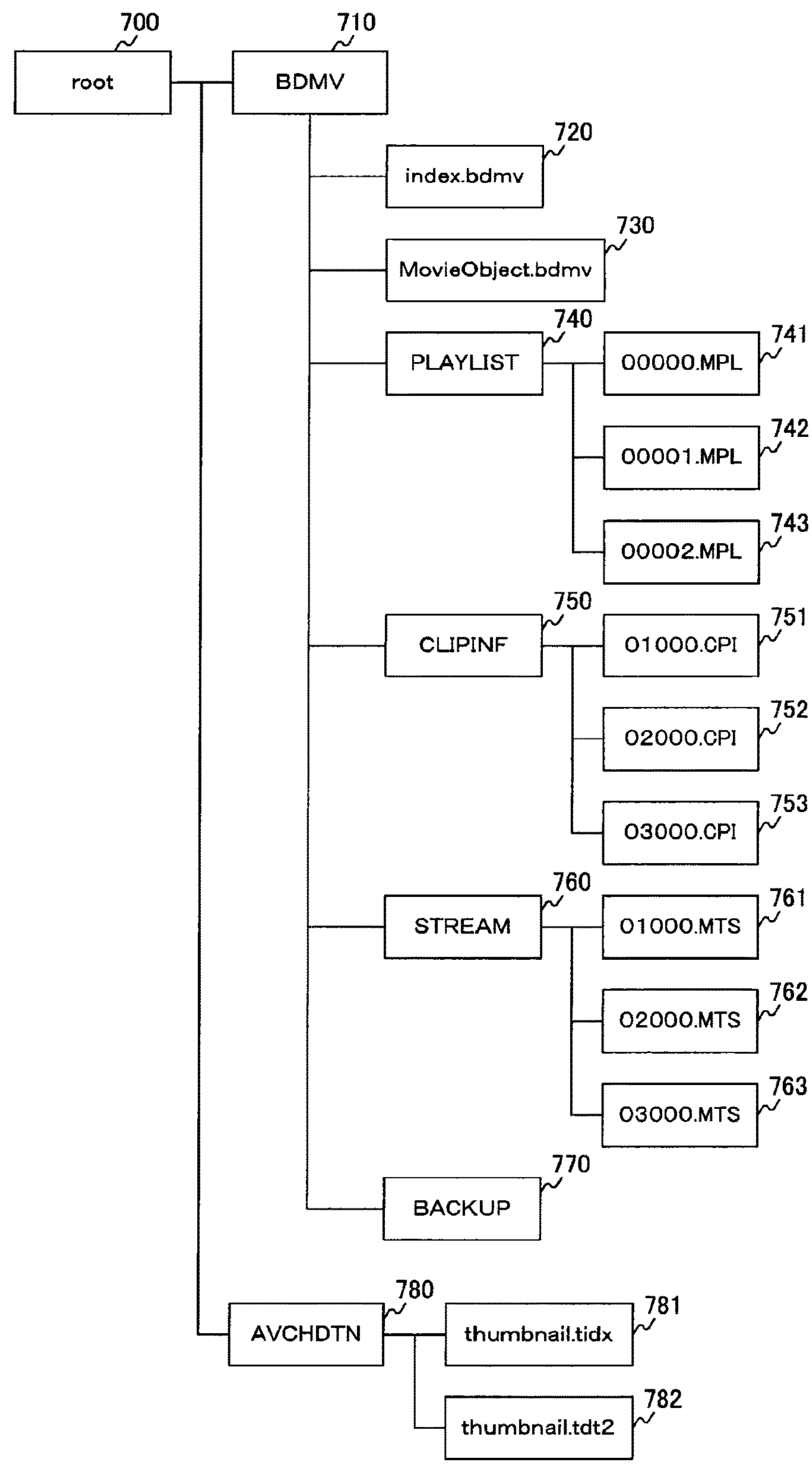
FIG. 14 A block diagram showing an example of a data structure of a moving image file in the second embodiment.

FIG. 14 is a diagram showing an example of a data structure of a moving image file in the AVCHD standard. Under a root directory (root) 700 of a recording medium, a directory "BDMV" 710 having contents of clips is arranged. Further, as necessary, a directory "AVCHDTN" 780 containing thumbnails is arranged under the root directory.

Immediately under the directory "BDMV" 710, a file "index.bdmv" 720 and a file "MovieObject.bdmv" 730 are arranged. Further, under the directory "BDMV" 710, a directory "PLAYLIST" 740, a directory "CLIPINF" 750, a directory "STREAM" 760, and a directory "BACKUP" 770 are arranged.

In the file "index.bdmv" 720, titles that are associated with respective moving images in the directory "BDMV" 710 are stored. Further, in the file "MovieObject.bdmv" 730, information on a movie object is stored.

The directory "PLAYLIST" 740 is a directory in which the databases of playlists are arranged. The directory "PLAYLIST" 740 contains, for example, files 741 to 743 that serve as files on playlists. The file name of a file in the directory "PLAYLIST" 740 is constituted of a five-digit number and an extension. For example, ".MPL" is used as the extension of each file.

The directory "CLIPINF" 750 is a directory in which the databases of clips are arranged. The directory "CLIPINF" 750 contains, for example, files 751 to 753 that serve as clip information files on respective clips. Each clip information file contains moving image metadata that accompanies a moving image corresponding to a clip. The file name of a file in the directory "CLIPINF" 750 is constituted of a five-digit number and an extension. For example, ".CPI" is used as the extension of each file.

The directory "STREAM" 760 is a directory in which substantial moving image data is arranged. The directory "STREAM" 760 contains, for example, moving image data 761 to 763 that correspond to the respective clip information files. The file name of a file in the directory "STREAM" 760 is constituted of a five-digit number and an extension. The five-digit number part of the file name is the same as that of the clip information file corresponding thereto, and thus a correlation between the clip information file and this moving image data is represented. Further, ".MTS" is used as the extension of each file.

The directory "BACKUP" 770 stores data for backup of the directories and files.

In the directory "AVCHDTN" 780, two types of thumbnail files of "thumbnail.tidx" 781 and "thumbnail.tdt2" 782 can be arranged. The thumbnail file of "thumbnail.tidx" 781 is a file in which index information of thumbnail image data is stored, and the thumbnail file of "thumbnail.tdt2" 782 is an aggregate of the thumbnail image data.

FIG. 15 is a diagram showing an example of a reference value stored in the clip information file. FIG. 15(*a*) is an example of a positional reference value that is stored in a clip information file in the forward moving image file before the connection. For example, an area of "Entry#1Info" is provided in the clip information file, and a latitude of "35.681382" and a longitude of "139.766084" that serve as a reference value of the forward moving image file are stored in that area. The clip information file in the backward moving image file before the connection is invalidated at the time of the connection, and thus it is omitted in FIG. 15.

FIG. 15(*b*) is an example of a reference value that is stored in the clip information file in the forward moving image file after the connection. Compared with FIG. 15(*a*), an area of "Entry#2Info" is added in the clip information file, and the reference value (a latitude of "35.681391" and a longitude of "139.766076") of the backward moving image file is stored in that area. Further, in the "Entry#1Info" and the "Entry#2Info", the start addresses and the end addresses of the image metadata containing offsets based on the respective reference values are added.

Figure 16:
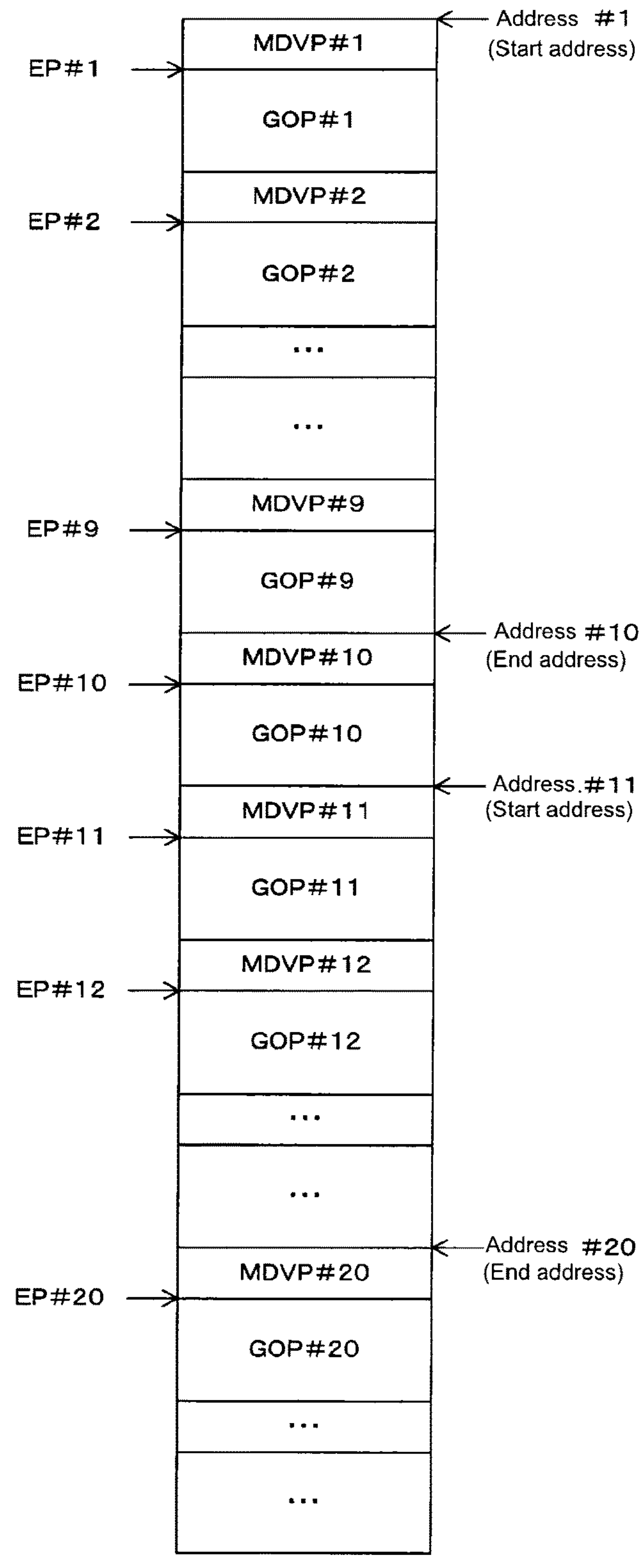
FIG. 16 A diagram showing an example of a data structure of moving image data in a "STREAM" file in the second embodiment.

FIG. 16 is a diagram showing an example of a data structure of the moving image data in the "STREAM" file. The moving image data contains one or more GOPs. An MDVP (Modified Digital Video Pack) is added to the head of each GOP. The MDVP contains image metadata that accompanies an image in the GOP. In the image metadata, an offset is stored. Further, the address of the head of each GOP is referred to as "EP (Entry Point)". In the clip information file, the reproduction start and end positions of a moving image is specified by the EP on a GOP basis. Here, it is assumed that a backward moving image file containing GOP#11 to GOP#20 is connected to a forward moving image file containing GOP#1 to GOP#10. In this case, the offsets in the MDVP#1 to MDVP#10 added to the GOP#1 to GOP#10 are offsets from the reference value of the forward moving image file. Further, the offsets in the MDVP#11 to MDVP#20 added to the GOP#11 to GOP#20 are offsets from the reference value of the backward moving image file. In the clip information file, in association with the reference value of the forward moving image file, an address#1 of the head position of the MDVP#1 is added as a start address, and an address#10 of the head position of the MDVP#10 is added as an end address. Additionally, the reference value of the backward moving image file is added to the clip information file. In association with that reference value, an address#11 of the head position of the MDVP#11 is added as a start address, and an address#20 of the head position of the MDVP#20 is added as an end address.

FIG. 17 is a diagram showing an example of a data structure of the MDVP in the AVCHD standard. Here, a syntax is shown based on a descriptive method for a C language that is used as a program description language.

The MDVP is stored in an elementary stream of the moving image data to serve as user data. In the user data, a field of "uuid_iso_iec_11578" has a data length of 128 bits. In this field, a universally unique identifier (UUID) that is defined by "ISO/IEC 11578" is stored.

A field of "type indicator" has a data length of 32 bits and indicates the data type of the user data. When the data type is "0x4741 3934", the user data is caption data (cc_data) of a closed caption (CC). When the data type is "0x4D44 504D", the user data is image metadata (ModifiedDVPack-Meta) in the MDVP.

In the image metadata of the MDVP, an arbitrary number of entries of an MDP (one_modified_dv_pack) having a 40-bit length is contained. The number of entries is stored in a field of "number_of_modified_dv_pack_entries" having an 8-bit length. One MDP contains a field of "mdp_id" that has an 8-bit length and indicates an ID of the MDP, and a field of "mdp_data" that has a 32-bit length and indicates MDP data.

FIG. 18 is a diagram showing an example of a field provided in the MDVP in the second embodiment. As shown in the figure, fields for storing image metadata including information on a date and time at which an image is captured, information on imaging conditions such as an exposure time and an F number, information on GPS, reserved information, and the like are provided in association with the respective IDs of the MDVPs. As described above, since a field corresponding to one ID has a 32-bit length, part of information such as a date and time at which an image is captured is divided into two or more fields as necessary and then stored. It should be noted that, in general, among those fields, the acquired latitude and longitude are not stored in a field in which a latitude and a longitude of GPS are stored. Instead of this, in a field of "Reserved" for reserved information, offsets including a latitude and a longitude that are based on the reference values are stored.

FIG. 19 is a diagram showing an example of an offset in the moving image file in the second embodiment. In the MDVP#1 to the MDVP#20 located at the address#1 to the address#20, offsets corresponding to images accompanied by the respective MDVPs are stored. For example, the MDVP#1 is data that accompanies the first GOP of the forward moving image file, and thus a latitude of "+0.000000" and a latitude of "+0.000000" to serve as an offset are stored in the field corresponding to the MDVP#1. The MDVP#2 to MDVP#10 are image metadata that accompany the second and following GOPs in the forward moving image file, and thus offsets from the reference value of the forward moving image file are stored in the respective fields corresponding to the MDVP#2 to MDVP#10. Additionally, the MDVP#11 is data that accompanies the first GOP of the backward moving image file, and thus a latitude of "±0.000000" and a latitude of "±0.000000" to serve as an offset are stored in the field corresponding to the MDVP#1. The MDVP#12 to MDVP#20 are image metadata that accompany the second and following GOPs in the backward moving image file, and thus offsets from the reference value of the backward moving image file are stored in the MDVP#12 to MDVP#20, respectively.

Figures 20, 21:
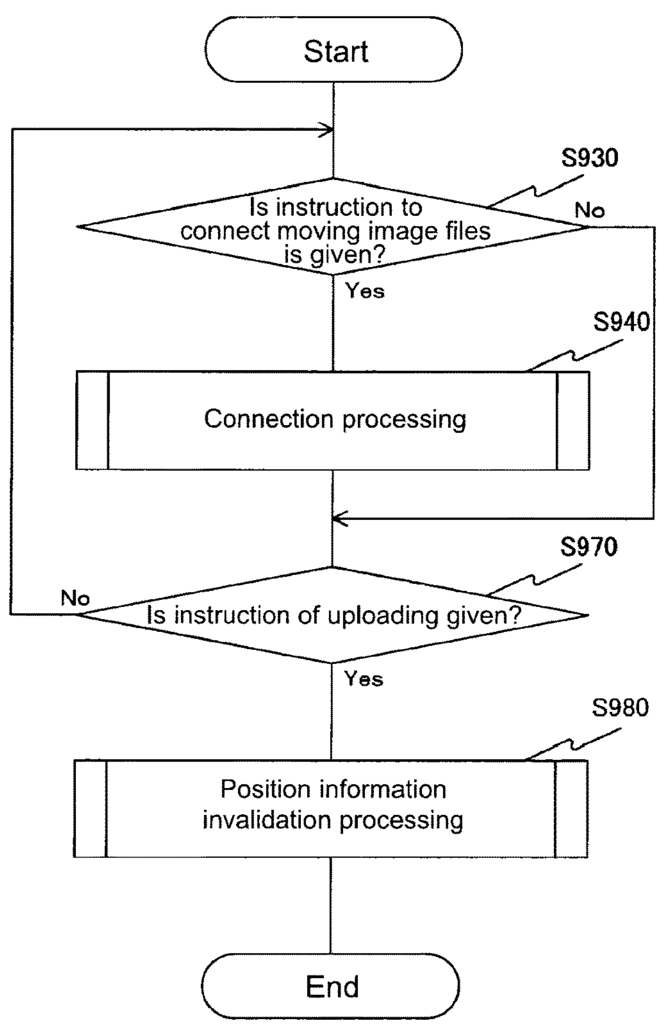
FIG. 20 A diagram showing an example of an offset in a clip information file in the second embodiment.
FIG. 21 A flowchart showing an example of an operation of the information processing apparatus in the second embodiment.

FIG. 20 is a diagram showing an example of an offset in the clip information file. When the connected moving image file is uploaded, the information processing apparatus 201 invalidates the initial reference values and replaces the reference values in the clip information file with new offsets that are based on the initial reference values before the invalidation. For example, since the initial reference value is stored in the "Entry#1Info", that reference value is replaced with a new offset of a latitude of "±0.000000" and a latitude of "±0.000000". Since the second reference value is stored in the "Entry#2Info", that reference value is replaced with a new offset from the initial reference value, which corresponds to a latitude of "+0.000010" and a latitude of "−0.000004".

Operation Example of Information Processing Apparatus

FIG. 21 is a flowchart showing an example of an operation of the information processing apparatus 201 in the second embodiment. The information processing apparatus 201 determines whether an instruction to connect the moving image files is given (Step S930). In the case where an instruction to connect the moving image files is given (Step S930: Yes), the information processing apparatus 201 execute the connection processing for connecting the moving image files (Step S940). In the case where an instruction to connect the moving image files is not given (Step S930: No) or after Step S940 is performed, the information processing apparatus 201 determines whether an instruction to upload the moving image file is given (Step S970). In the case where an instruction to upload the moving image file is not given (Step S970: No), the information processing apparatus 201 returns to Step S930. In the case where an instruction to upload the moving image file is given (Step S970: Yes), the information processing apparatus 201 executes position information invalidation processing for invalidating the position information (Step S980).

Figure 22:
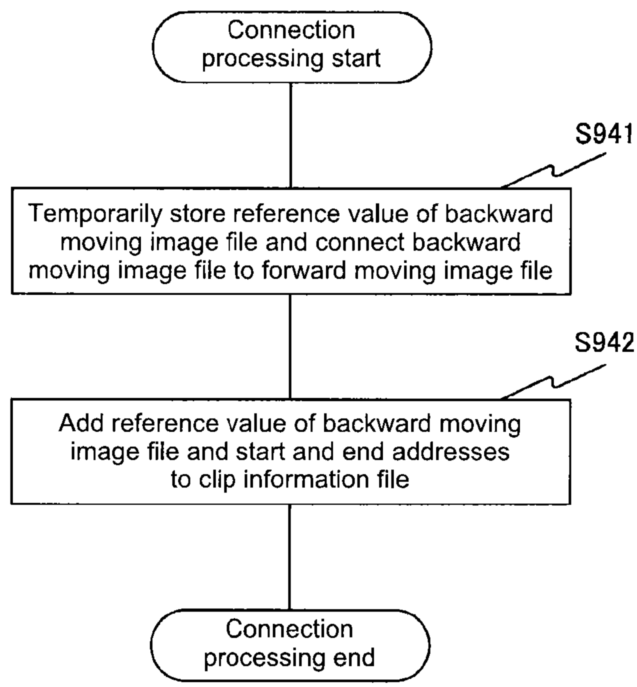
FIG. 22 A flowchart showing an example of connection processing in the second embodiment.

FIG. 22 is a flowchart showing an example of the connection processing in the second embodiment. The information processing apparatus 201 temporarily stores the reference value and invalidates the clip information file in the backward moving image file. Subsequently, the information processing apparatus 201 connects the backward moving image file to the forward moving image file in accordance with the format of the moving image files (Step S941). Subsequently, the information processing apparatus 201 adds the reference value of the backward moving image file, which is temporarily stored, to the clip information file of the forward moving image file. Further, the information processing apparatus 201 adds the start addresses and the end addresses to the clip information file of the forward moving image file in association with the respective reference values (Step S942). After Step S942, the information processing apparatus 201 terminates the connection processing.

Figure 23:
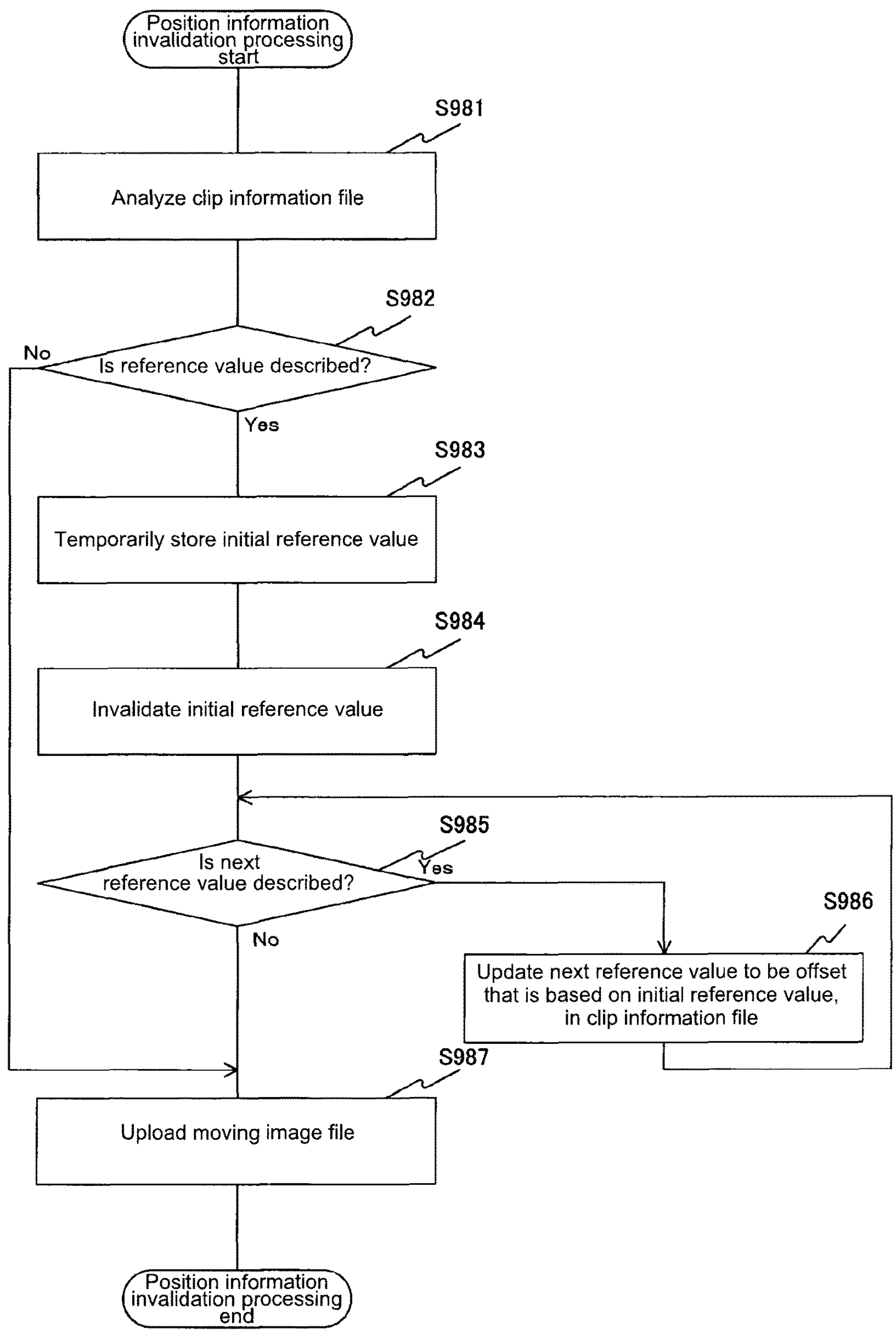
FIG. 23 A flowchart showing an example of position information invalidation processing in the second embodiment.

FIG. 23 is a flowchart showing an example of the position information invalidation processing in the second embodiment. The information processing apparatus 201 analyzes the clip information file in the moving image file (Step S981). The information processing apparatus 201 determines whether a reference value is described in the clip information file (Step S982). If a reference value is described (Step S982: Yes), the information processing apparatus 201 temporarily stores that initial reference value in the clip information file (Step S983). The information processing apparatus 201 invalidates the initial reference values in the clip information file (Step S984). The information processing apparatus 201 determines whether the next reference value is described (Step S985). If the next reference value is described (Step S985: Yes), the information processing apparatus 201 updates the next reference value to be a new offset that is based on the initial reference value, in the clip information file (Step S986). After Step S986, the information processing apparatus 201 returns to Step S985. In the case where a reference value is not described (Step S982: No) or the next reference value is not described (Step S985: No), the information processing apparatus 201 uploads the moving image file (Step S987). After Step S987, the information processing apparatus 201 terminates the position information invalidation processing.

In such a manner, according to the second embodiment, the information processing apparatus 201 connects the moving image files, adds the reference value of the backward moving image file to the forward moving image file, and adds the start addresses and the end addresses that are associated with the respective reference values. Consequently, the information processing apparatus 201 can connect the moving image files while maintaining the correlation between the reference values and the offsets.

Further, when the moving image files are moved, the information processing apparatus 201 invalidates the initial reference values and replaces the reference values with new offsets from the initial reference values. Consequently, the information processing apparatus 201 can invalidate the position information at high speed in the connected moving image file.

3. Third Embodiment

Configuration Example of Information Processing System

Figure 24:
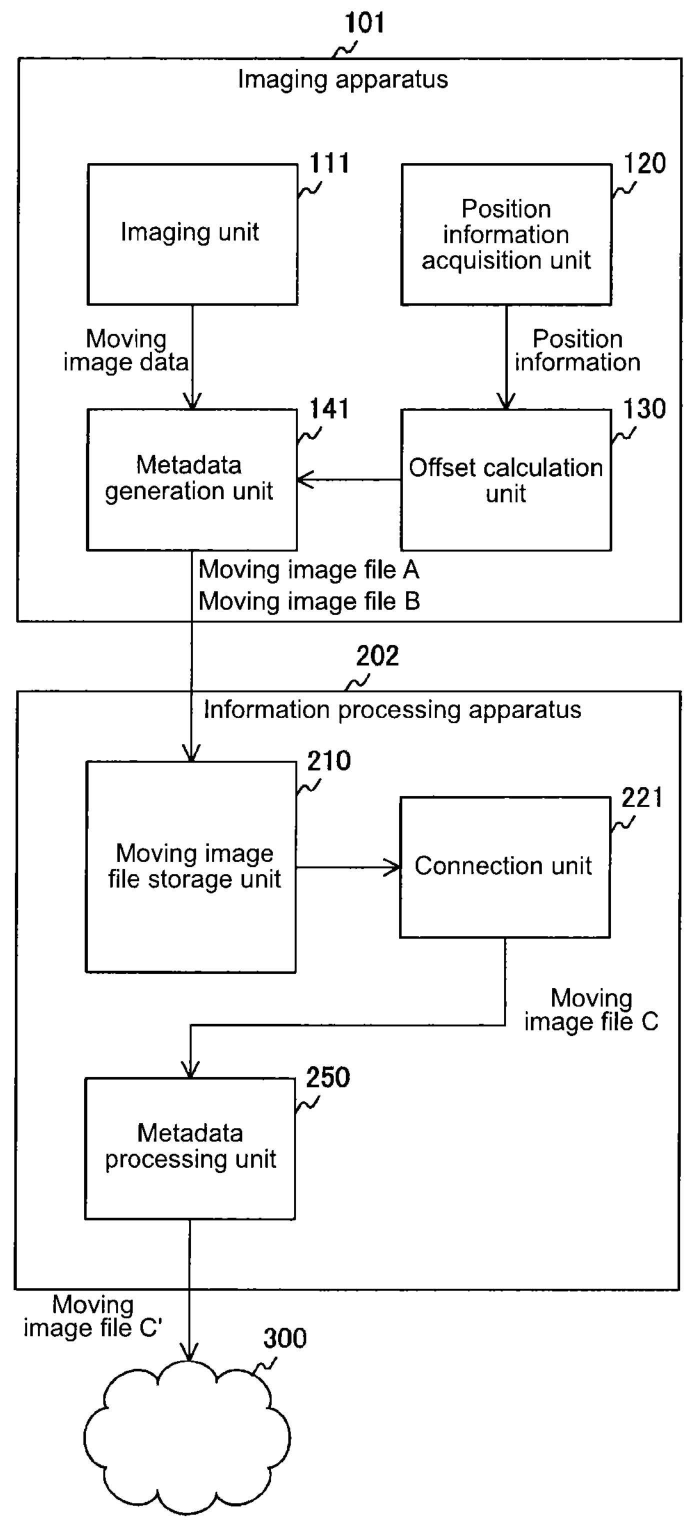
FIG. 24 A block diagram showing an example of an information processing system in a third embodiment.

FIG. 24 is a block diagram showing one configuration example of an information processing system in a third embodiment. The information processing system in the second embodiment calculates the new offsets when the moving image files are moved. In contrast to this, the information processing system in the third embodiment is different from that in the second embodiment in that new offsets are calculated when the moving image files are connected. Specifically, the information processing system in the third embodiment is different from that in the second embodiment in that an information processing apparatus 202 is provided instead of the information processing apparatus 201. The information processing apparatus 202 is different from the information processing apparatus 201 in the second embodiment in that a connection unit 221 and a metadata processing unit 250 are provided instead of the connection unit 220 and the metadata processing unit 251.

The connection unit 221 connects the moving image files and calculates a difference between any of reference values and each of the reference values to obtain the difference as a new offset. More specifically, the connection unit 221 calculates, as a new offset, a value obtained by subtracting the reference value of the forward moving image file from each of the reference values of the forward moving image file and the backward moving image file. Subsequently, the connection unit 221 replaces the reference values with the new offsets in the clip information file of the forward moving image file. Additionally, the connection unit 221 adds start addresses and end addresses of image metadata containing offsets that are based on the new offsets to be associated with the respective new offsets.

FIG. 25 is a diagram showing an example of a reference value and an offset in a clip information file in the third embodiment. The connection unit 221 provides a field of "Enty_basisInfo" as shown in FIG. 25(*a*) and fields such as "Entry#1Info" and "Entry#2Info" as shown in FIG. 25(*b*) in the clip information file.

The "Enty_basisInfo" field is a field for storing the reference value of the forward moving image file. For example, the reference value of a latitude of "35.63812" and a longitude of "139.766084" is stored.

The fields such as "Entry#1Info" and "Entry#2Info" are fields for storing new offsets. For example, since the initial reference value is stored in the "Entry#1Info", a latitude of "±0.000000" and a latitude of "+0.000000" are stored as an offset. In the "Entry#2Info", a difference between the reference values of the backward moving image file and the forward moving image file, which corresponds to a latitude of "+0.000010" and a latitude of "−0.000004", is stored as a new offset. Further, the start addresses and the end addresses of the image metadata containing offsets that are based on the respective new offsets are added to be associated with the respective new offsets.

Operation Example of Information Processing Apparatus

Figure 26:
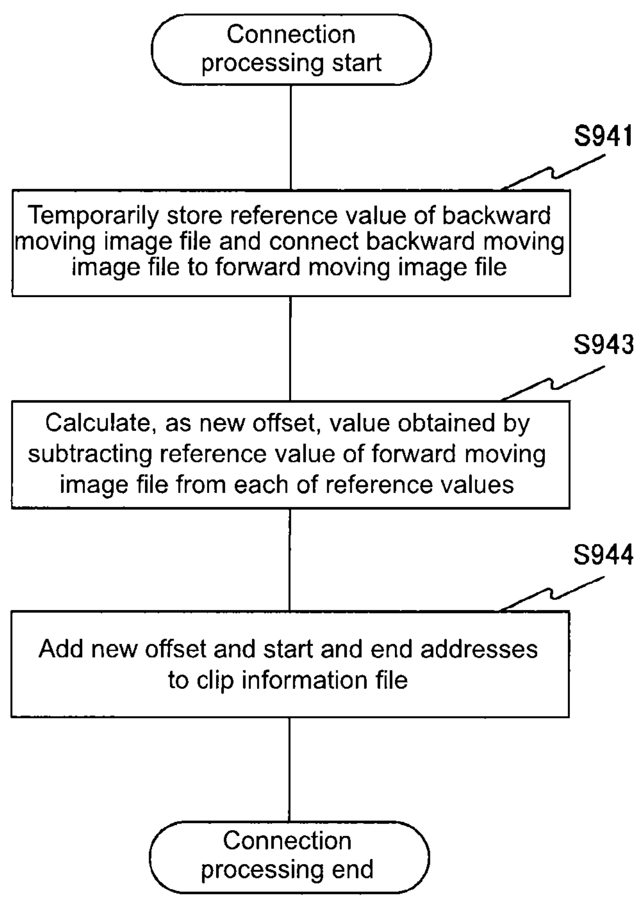
FIG. 26 A flowchart showing an example of connection processing in the third embodiment.

FIG. 26 is a flowchart showing an example of connection processing in the third embodiment. The connection processing in the third embodiment is different from the connection processing in the second embodiment in that Steps S943 and S944 are executed instead of Step S942.

The information processing apparatus 202 connects the backward moving image file to the forward moving image file (Step S941) and calculates, as a new offset, a value obtained by subtracting the reference value of the forward moving image file from each of the reference values of the forward moving image file and the backward moving image file (Step S943). The information processing apparatus 201 replaces the reference values with the new offsets in the clip information file of the forward moving image file. Further, the information processing apparatus 202 adds the start addresses and the end addresses of the image metadata containing offsets that are based on the respective new offsets, to be associated with the respective new offsets (Step S944). After Step S944, the information processing apparatus 202 terminates the connection processing.

In such a manner, according to the third embodiment, when the moving image files are connected, the new offsets from the reference value of the forward moving image file are previously calculated, and the respective reference values are replaced with the new offsets. Consequently, when the reference values are invalidated, it is unnecessary to calculate the new offsets as in the second embodiment, and it is possible to invalidate the position information at higher speed.

Second Modified Example

Figure 27:
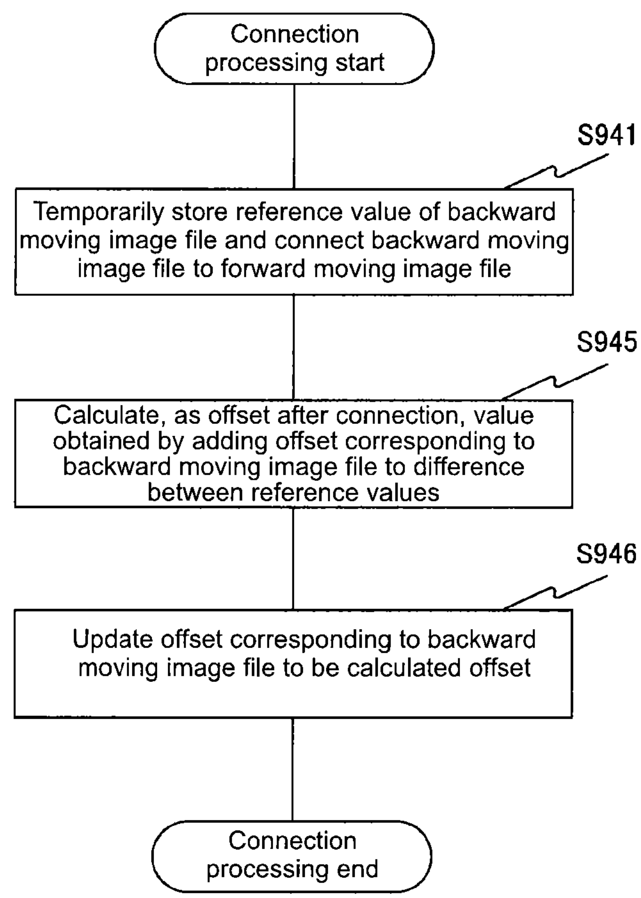
FIG. 27 A flowchart showing an example of connection processing in a second modified example.

FIG. 27 is a flowchart showing an example of connection processing in a second modified example. The information processing apparatus 202 of the third embodiment does not update the offsets multiplexed into the moving image in the backward moving image file, also after the connection. In contrast to this, an information processing apparatus 202 of the second modified example is different from that of the third embodiment in that the offsets multiplexed into the moving image in the backward moving image file are replaced with offsets from the reference value of the forward moving image file. Specifically, the connection processing in the second modified example is different from the connection processing in the third embodiment in that Steps S945 and S946 are executed instead of Steps S943 and S944.

The information processing apparatus 202 connects the moving image files (Step S941). Subsequently, the information processing apparatus 202 calculates, as an offset after connection, a value obtained by adding the offset, which corresponds to the backward moving image file, to a difference between the reference values of the forward moving image file and the backward moving image file (Step S945). The information processing apparatus 202 updates the offset, which corresponds to the backward moving image file, to be the calculated offset (Step S945). After Step S945, the information processing apparatus 202 terminates the connection processing.

FIG. 28 is a diagram showing an example of a reference value and an offset after the connection in the second modified example. FIG. 28(*a*) is an example of a reference value of a moving image file after the connection. As shown in FIG. 28(*a*), only the reference value of the forward moving image file, a latitude of "35.681382" and a longitude of "139.766084", is described as a reference value. FIG. 28(*b*) is an example of an offset after the connection. The offset stored in each of the MDVP#11 to the MDVP#20 is the offset of the backward moving image file, and thus it is replaced with an offset from the reference value of the forward moving image file. For example, since the MDVP#11 is the MDVP at the head of the backward moving image file before the connection, the MDVP#11 stores an offset of a latitude of "+0.000000" and a longitude of "±0.000000". Here, it is assumed that a difference between the reference values of the forward moving image file and the backward moving image file is a latitude of "+0.000010" and a longitude of "−0.000004". In this case, in the MDVP#11, the offset is updated to be a value obtained by adding the latitude of "±0.000000" and the longitude of "+0.000000" before the connection to the difference between the respective reference values.

In such a manner, according to the second modified example, the information processing apparatus 202 replaces the offsets multiplexed into the moving image in the backward moving image file with the offsets from the reference value of the forward moving image file. Consequently, it is unnecessary to store, as new offsets, the differences between the respective reference values in the moving image metadata as in the third embodiment. Further, it is also unnecessary to store the start address and the end address in the moving image metadata.

4. Fourth Embodiment

Configuration Example of Information Processing System

Figure 29:
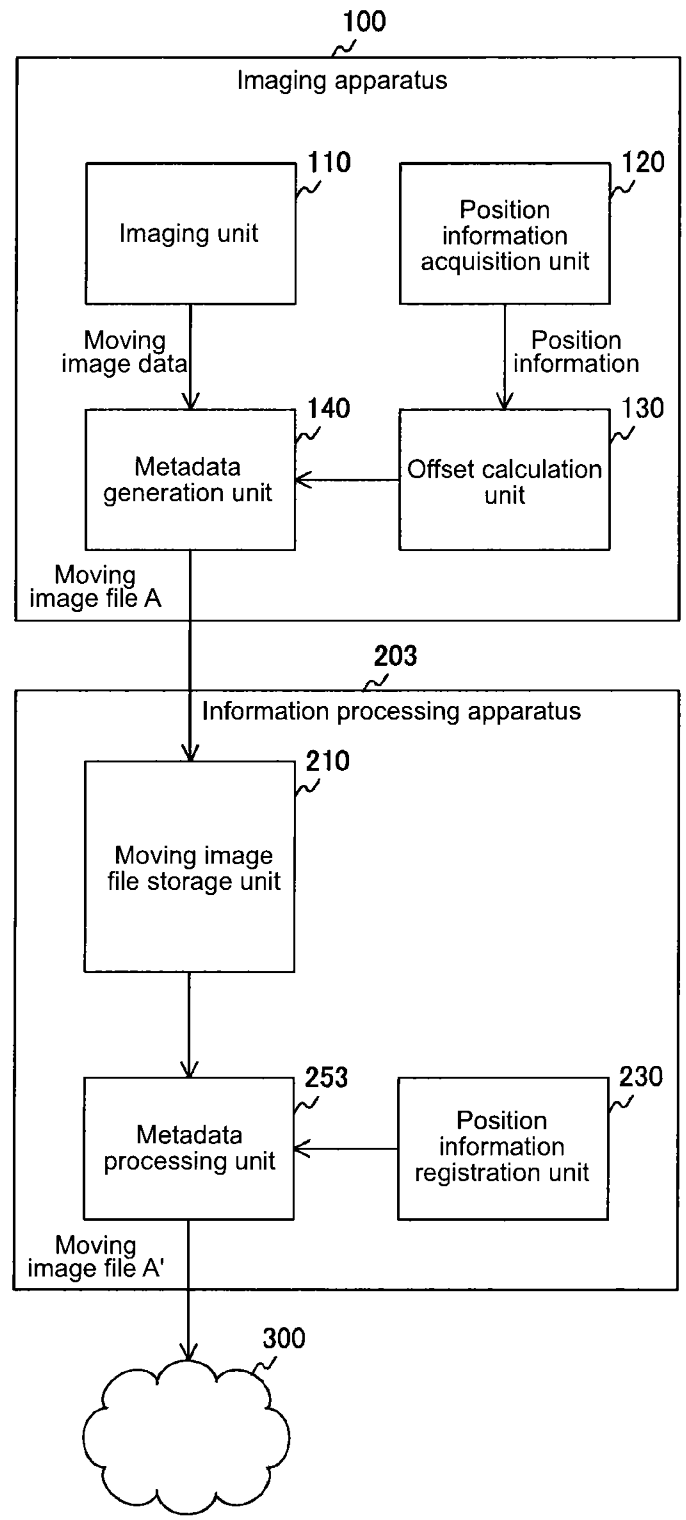
FIG. 29 A block diagram showing an example of an information processing system in a fourth embodiment.

FIG. 29 is a block diagram showing one configuration example of an information processing system in a fourth embodiment. The information processing system of the fourth embodiment is different from that of the first embodiment in that only a reference value registered as a position to be invalidated is invalidated. Specifically, the information processing system in the fourth embodiment is different from the information processing system in the first embodiment in that an information processing apparatus 203 is provided instead of the information processing apparatus 200. The information processing apparatus 203 is different from the information processing apparatus 200 of the first embodiment in that a metadata processing unit 253 is provided instead of the metadata processing unit 250 and a position information registration unit 230 is further provided.

The position information registration unit 230 registers position information to be invalidated. For example, position information of a home and a friend's home are registered as position information to be invalidated.

When a moving image file is moved, if a reference value in the moving image file indicates a position indicated by the registered position information, the metadata processing unit 253 invalidates the reference value.

It should be noted that the position information registration unit 230 is an example of a registration unit described in the section "Claims".

Operation Example of Information Processing Apparatus

Figure 30:
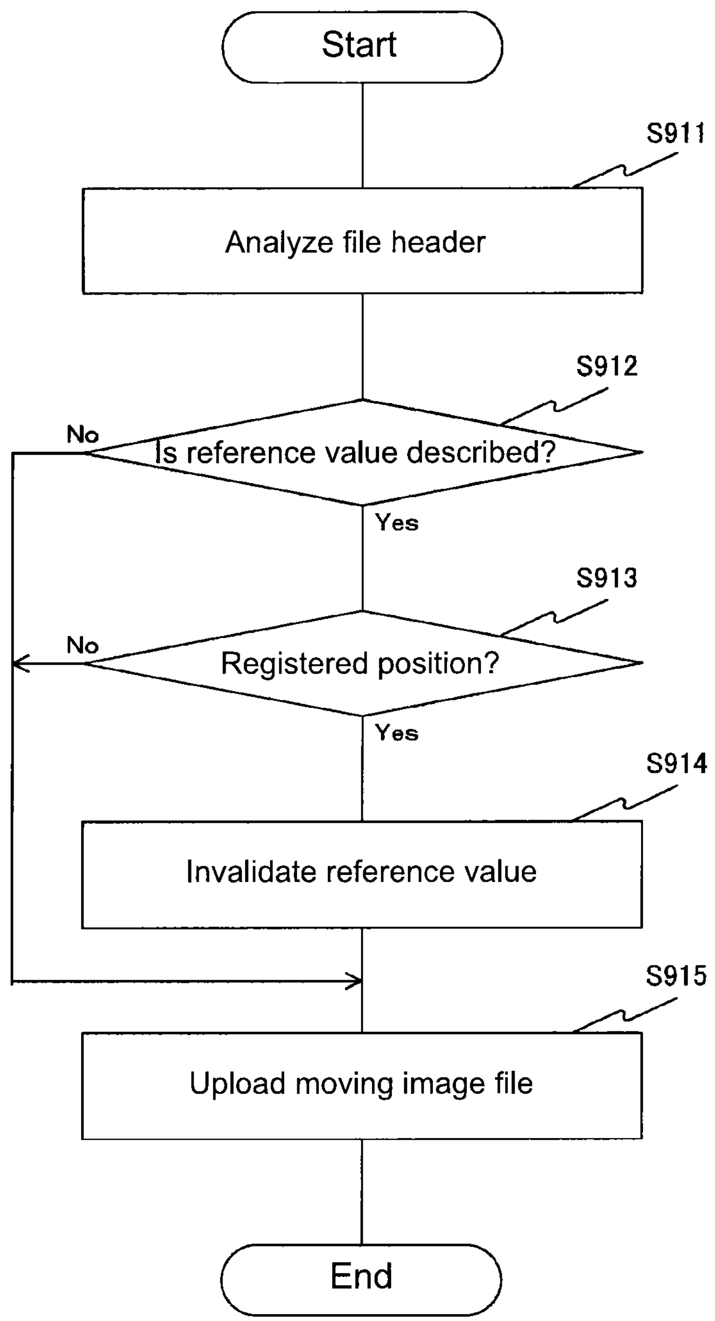
FIG. 30 A flowchart showing an example of an operation of the information processing apparatus in the fourth embodiment.

FIG. 30 is a flowchart showing an example of an operation of the information processing apparatus 203 in the fourth embodiment. The operation of the information processing apparatus 203 is different from that of the information processing apparatus 200 of the first embodiment in that Step S913 is further executed.

If there is description on the reference value (Step S912: Yes), the information processing apparatus 203 determines whether the reference value indicates a registered position (Step S913). If the reference value indicates a registered position (Step S913: Yes), the information processing apparatus 203 invalidates the reference value (Step S914). If there is no description on the reference value (Step S912: No), if the reference value does not indicate the registered position (Step S913: No), or after Step S914 is performed, the information processing apparatus 203 uploads the moving image file (Step S915).

In such a manner, according to the fourth embodiment, the information processing apparatus 203 previously registers the position to be invalidated, and when a moving image file whose reference value indicates the registered position is moved, the reference value is invalidated. Only the registered reference value is invalidated, and thus convenience for a user is improved.

5. Fifth Embodiment

Configuration Example of Information Processing System

Figure 31:
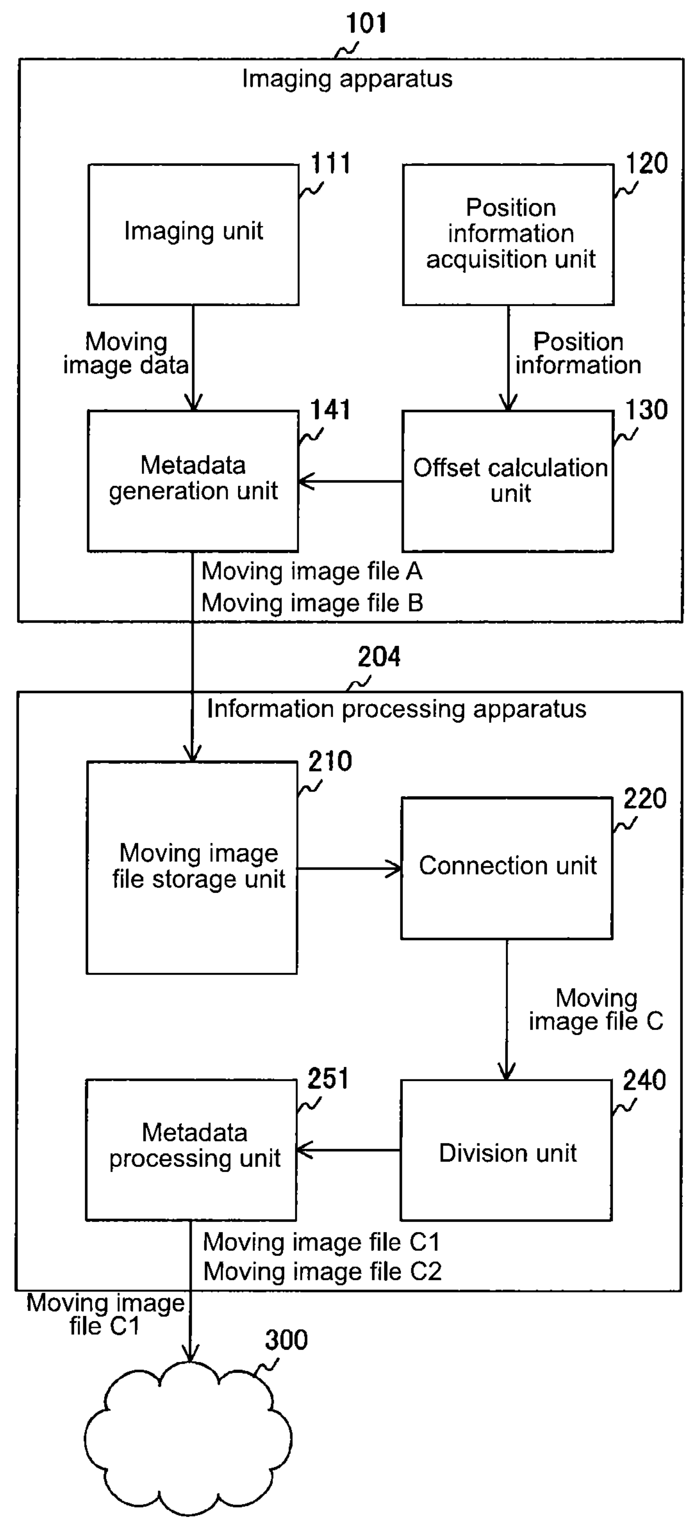
FIG. 31 A block diagram showing an example of an information processing system in a fifth embodiment.

FIG. 31 is a block diagram showing one configuration example of an information processing system in a fifth embodiment. The information processing system in the fifth embodiment is different from the information processing system in the second embodiment in that a connected moving image file can be further divided. Specifically, the information processing system in the fifth embodiment is different from the information processing system in the second embodiment in that an information processing apparatus 204 is provided instead of the information processing apparatus 201. The information processing apparatus 204 is different from the information processing apparatus 201 in the second embodiment in that a division unit 240 is further provided.

The division unit 240 divides a moving image file. Specifically, the division unit 240 divides a moving image file into a forward moving image file and a backward moving image file at a specified address. In FIG. 31, moving image files C1 and C2 are examples of the forward moving image file and the backward moving image file. An address of a position at which the moving image file is divided is hereinafter referred to as a "dividing position address". The dividing position address is, for example, a relative address based on the head of the moving image file. In the division, the division unit 240 newly generates a clip information file of the backward moving image file. The division unit 240 updates a start address and an end address in the clip information file of the forward moving image file as necessary. For example, in the case where the start address is an address posterior to the dividing position address or in the case where there is only one reference value corresponding to a start address anterior to the dividing position address, the start address and the end address corresponding thereto are deleted. Further, in the case where the start address is located anterior to the dividing position address and the end address is located posterior to the dividing position address, the end address is updated to be the dividing position address.

Subsequently, the division unit 240 reads out the reference value, which is a reference of an offset of the backward moving image file, from the forward moving image file and adds the reference value to the clip information file of the backward moving image file. When a plurality of reference values are added to the backward moving image file, the division unit 240 adds a start address and an end address of image metadata containing an offset in association with each of the reference values. The division unit 240 invalidates the reference value added to the backward moving image file in the forward moving image file.

It should be noted that the forward moving image file is an example of a third moving image described in the section "Claims". Further, the backward moving image file is an example of a fourth moving image described in the section "Claims".

Operation Example of Information Processing Apparatus

Figure 32:
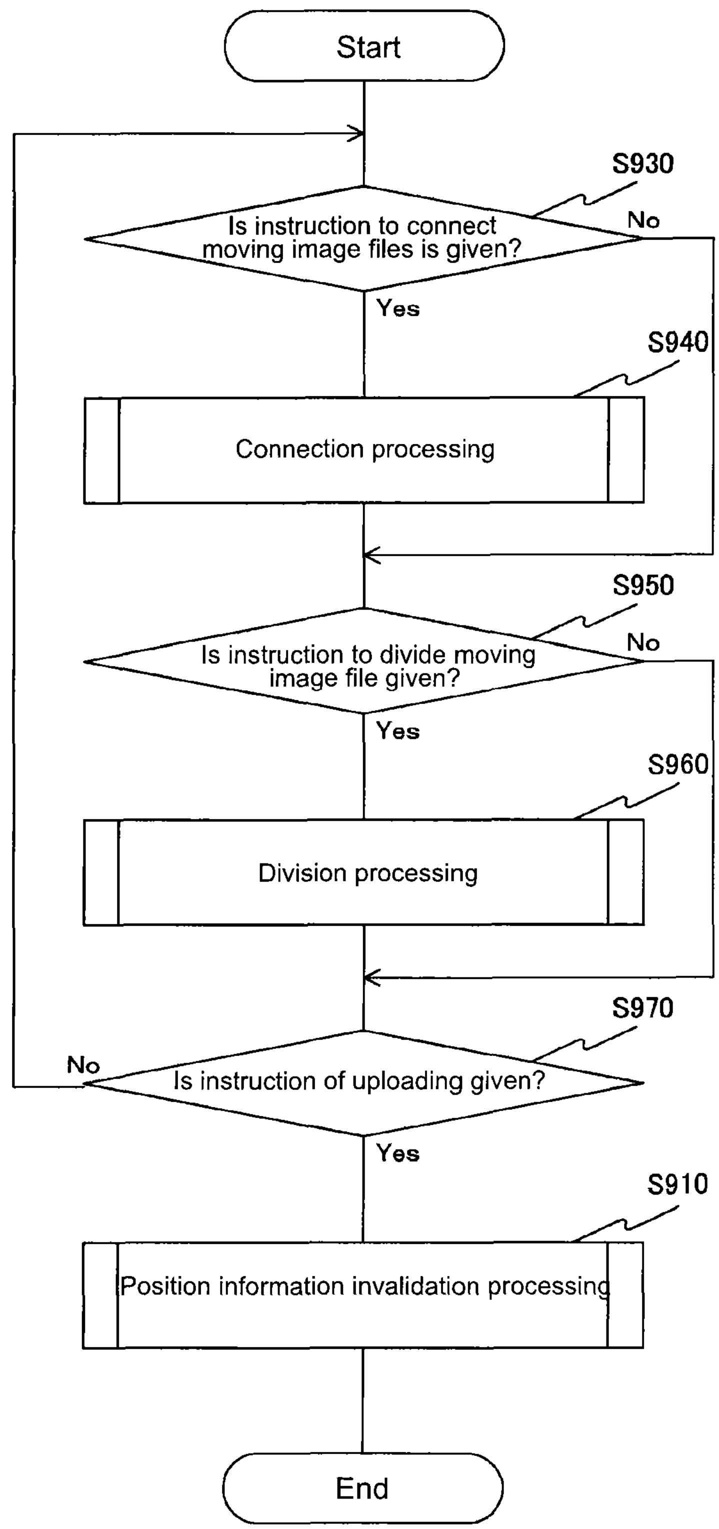
FIG. 32 A flowchart showing an example of an operation of the information processing apparatus in the fifth embodiment.

FIG. 32 is a flowchart showing an example of an operation of the information processing apparatus 204 in the fifth embodiment. The operation of the information processing apparatus 204 in the fifth embodiment is different from that of the second embodiment in that Step S910 is executed instead of Step S980, and Steps S950 and S960 are further executed.

In the case where an instruction to connect moving image files is not given (Step S930: No) or after connection processing is executed (Step S940), the information processing apparatus 204 determines whether an instruction to divide a moving image file is given (Step S950). If an instruction to divide a moving image file is given (Step S950: Yes), the information processing apparatus 204 executes division processing for dividing a moving image file (Step S960). If an instruction to divide a moving image file is not given (Step S950: No) or after the division processing is executed (Step S960), the information processing apparatus 204 determines whether an instruction of uploading is given (Step S970). In the case where an instruction of uploading is not given (Step S970: No), the information processing apparatus 204 returns to Step S930. In the case where an instruction of uploading is given (Step S970: Yes), the information processing apparatus 204 executes position information invalidation processing. The position information invalidation processing is the same processing as the position information invalidation processing in the first embodiment (Step S910).

Figure 33:
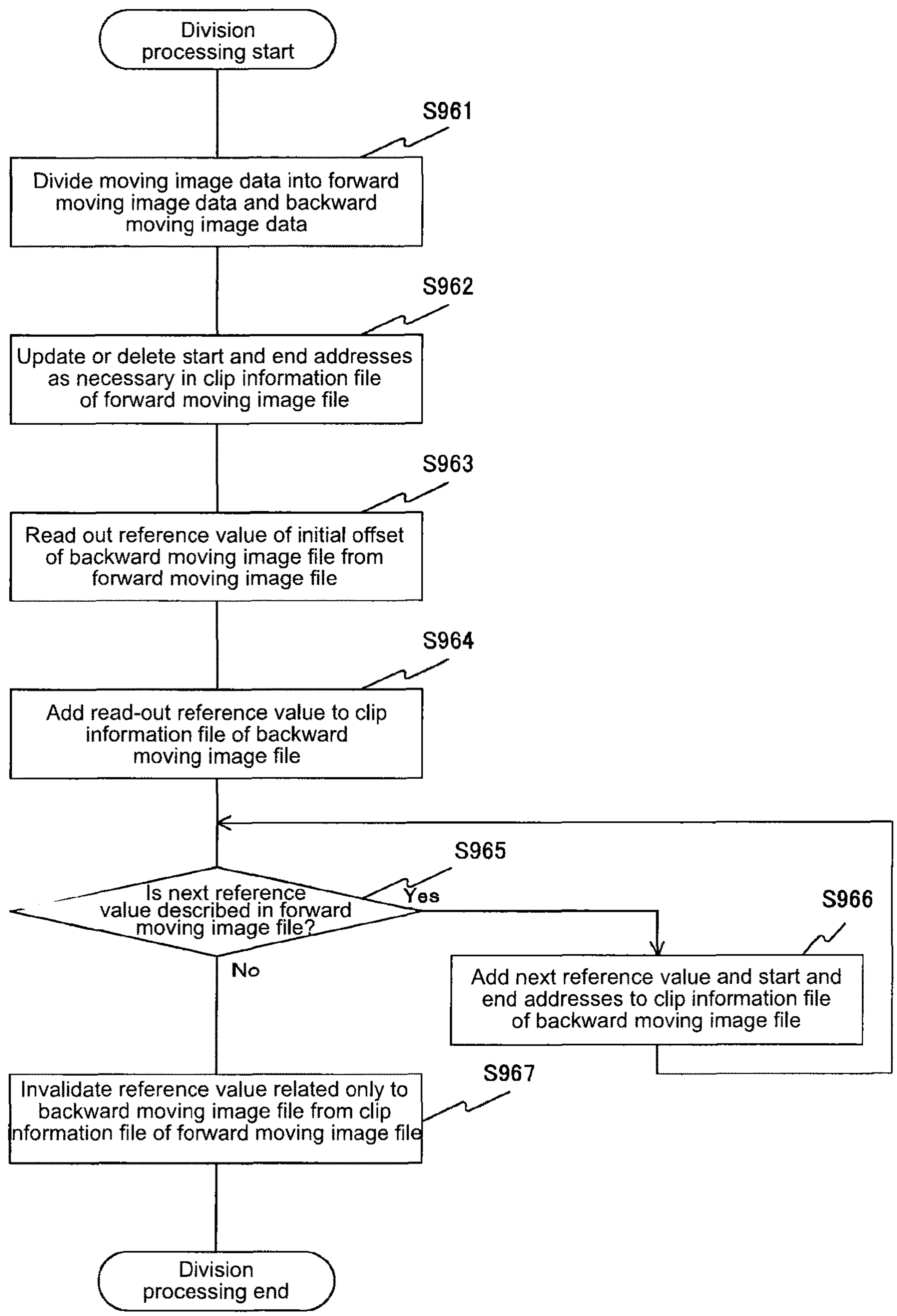
FIG. 33 A flowchart showing an example of division processing in the fifth embodiment.

FIG. 33 is a flowchart showing an example of the division processing in the fifth embodiment. The information processing apparatus 204 divides the moving image file into the forward moving image file and the backward moving image file (Step S961). The information processing apparatus 204 updates or deletes the start address and the end address in the clip information file of the forward moving image file as necessary (Step S962). The information processing apparatus 204 reads out the reference value, which is a reference of the initial offset of the backward moving image file, from the forward moving image file (Step S963). The information processing apparatus 204 adds the read-out reference value to the clip information file of the backward moving image file (Step S964). The information processing apparatus 204 determines whether there is description on the next reference value of the added reference value in the forward moving image file (Step S965). If there is description on the next reference value (Step S965: Yes), the information processing apparatus 204 adds the next reference value to the clip information file in the backward moving image file. Further, the information processing apparatus 204 adds a start address and an end address in association with the added reference value (Step S966). After Step S966, the information processing apparatus 204 returns to Step S965. If there is no description on the next reference value (Step S965: No), the information processing apparatus 204 invalidates the reference value, which is related only to the backward moving image file, from the clip information file of the forward moving image file (Step S967). After Step S967, the information processing apparatus 204 terminates the division processing.

FIG. 34 is a diagram showing an example of the reference value in the fifth embodiment. It is assumed a case where a moving image file including two or more reference values is divided and an address between the start and end addresses corresponding to the initial reference value is the dividing position address. In this case, as shown in FIG. 34(*a*), in the forward moving image file, the start address and end address and the reference value related only to the backward moving image file are invalidated, so that only one reference value is obtained. Further, as shown in FIG. 34(*b*), in the backward moving image file, a latitude of "35.681382" and a longitude of "139.766084" that serve as the reference value of the initial offset are added. Additionally, a latitude of "35.681391" and a longitude of "139.766076" and the like that are subsequent reference values are added. Subsequently, a start address and an end address are added in association with each of the reference values.

FIG. 35 is a diagram showing an example of the offset in the fifth embodiment. A case where a moving image file into which the MDVP#1 to MDVP#20 as shown in FIG. 19 are multiplexed is divided will be considered. The dividing position address is assumed to be an address between the MDVP#8 and the MDVP#9. In this case, the forward moving image file containing MDVP#1_1 to MDVP#1_8 and the backward moving image file containing MDVP#2_1 to MDVP#2_12 are generated. The MDVP#1_1 to MDVP#1_8 of the forward moving image file are data corresponding to the MDVP#1 to MDVP#8 before the division. The MDVP#2_1 and MDVP#2_2 of the backward moving image file are data corresponding to the MDVP#9 and MDVP#10 before the division. Offsets in those data are offsets that are based on the initial reference value. Further, the MDVP#2_3 and MDVP#2_12 of the backward moving image file are data corresponding to the MDVP#11 and MDVP#20 before the division. Offsets in those data are offsets that are based on the second reference value.

In such a manner, according to the fifth embodiment, the information processing apparatus 204 divides the moving image file to generate moving image metadata of the backward moving image file and adds the reference value, the start address, and the end address to the moving image metadata. Consequently, the information processing apparatus 204 can divide a moving image file while maintaining a correlation between each reference value and an offset.

Third Modified Example

Figure 36:
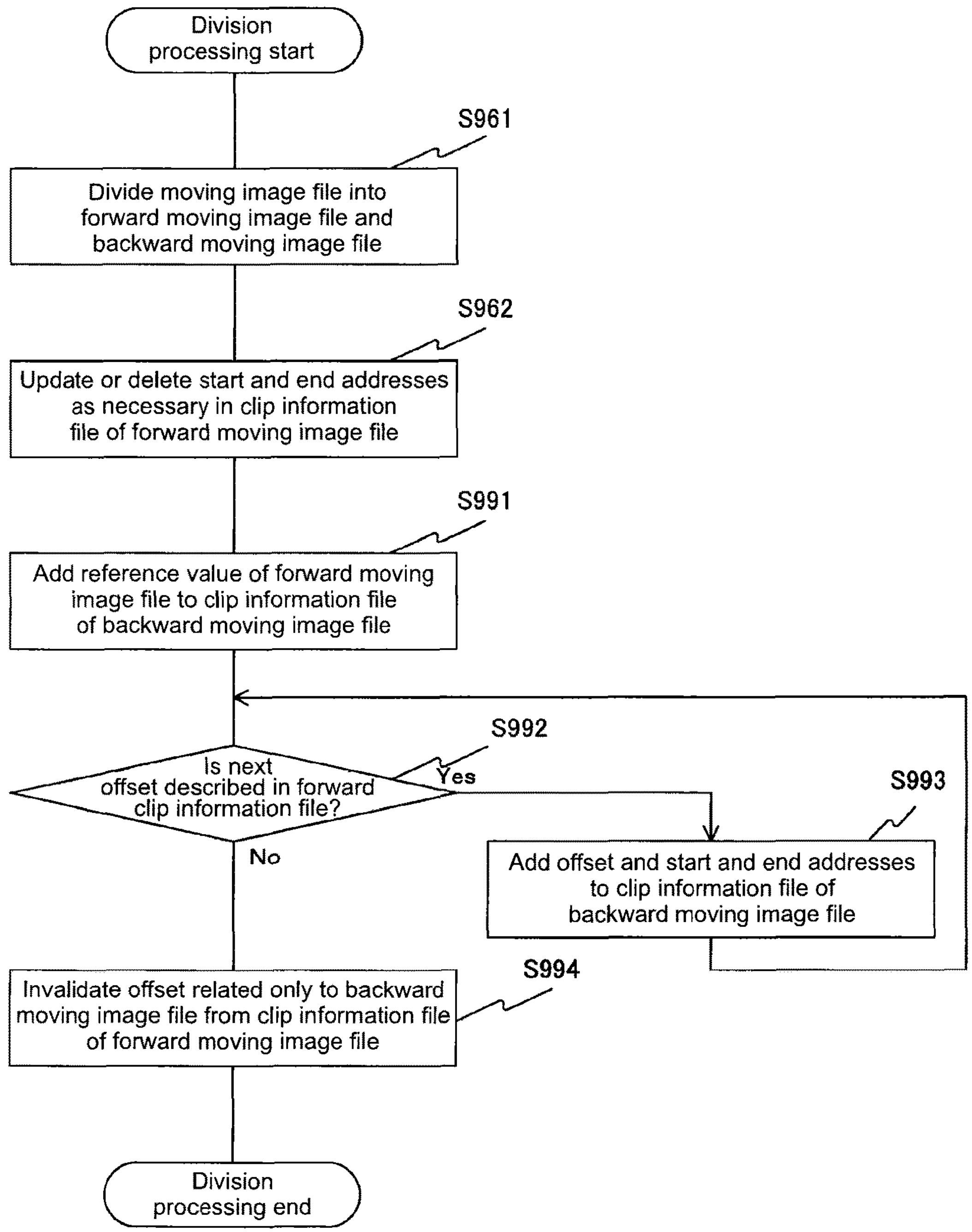
FIG. 36 A flowchart showing an example of division processing in a third modified example.

FIG. 36 is a flowchart showing an example of division processing in a third modified example. The information processing apparatus 204 of the fifth modified example includes the connection unit 220 and the metadata processing unit 250 in the second embodiment. In contrast to this, the information processing apparatus 204 of the third modified example is different from that of the fifth embodiment in that the connection unit 221 and the metadata processing unit 250 in the third embodiment are provided instead of the connection unit 220 and the metadata processing unit 251. Division processing of the third modified example is different from the division processing of the fifth embodiment in that Steps S991 to S994 are executed instead of Steps S964 to S967.

The information processing apparatus 204 updates or deletes the start address and the end address in the forward moving image file as necessary (Step S962), and reads out the reference value of the forward moving image file and adds the reference value to the clip information file of the backward moving image file (Step S991). Subsequently, the information processing apparatus 204 determines whether there is description on the next offset in the clip information file of the forward moving image file (Step S992). If there is description on the next offset (Step S992: Yes), the information processing apparatus 204 adds the next offset to the clip information file of the backward moving image file. Further, the information processing apparatus 204 adds the start address and the end address in association with each of the added reference value and offset (Step S993). After Step S993, the processing returns to Step S992. If there is no description on the next offset (Step S992: No), the information processing apparatus 204 invalidates an offset related only to the backward moving image file from the clip information file of the forward moving image file (Step S994). After Step S994, the information processing apparatus 204 terminates the division processing.

In such a manner, according to the third modified example, in the case where the connection processing of the third embodiment is performed, the moving image file can be divided while maintaining a correlation between the reference value and the offset.

It should be noted that the embodiments described above indicate examples for embodying the present technology, and the matters in the embodiments and the matters for specifying the invention in the section "Claims" have correlations respectively. Similarly, the matters for specifying the invention in the section "Claims" and the matters in the embodiments of the present technology that are denoted by the same names as those in the section "Claims" have correlations respectively. However, the present technology is not limited to the embodiments and can be embodied by variously modifying the embodiments without departing from the gist of the present technology.

Further, the processing procedures described in the embodiments described above may be regarded as a method including a series of those procedures or may be regarded as a program for causing a computer to execute the series of those procedures or as a recording medium on which the program is recorded. As the recording medium, for example, a CD (Compact Disc), an MD (MiniDisc), a DVD (Digital Versatile Disk), a memory card, a Blu-ray Disc (registered trademark)), and the like may be used.

It should be noted that the present technology can have the following configurations.

(1) An imaging apparatus, including:

an imaging unit to capture a moving image containing a plurality of images in a time-series order;

a position acquisition unit to acquire positions at which the plurality of images are captured;

an offset calculation unit to calculate, as an offset, a difference between a reference value that is any of the positions at which the plurality of images are captured and each of the positions to associate the offset with the image whose position is acquired; and a metadata generation unit to generate, as moving image metadata that accompanies the moving image, metadata containing the reference value and generate, as image metadata that accompanies the image corresponding to the offset, metadata containing the offset, for each of the acquired positions.

(2) The imaging apparatus according to (1) above, further including:

a storage unit to store the moving image, the moving image metadata, and the image metadata in a storage area; and a metadata processing unit to invalidate the reference value when the moving image metadata is moved from the storage area.

(3) The imaging apparatus according to (1) or (2) above, further including a registration unit to resister a position to be invalidated, in which the metadata processing unit invalidates the reference value if the reference value indicates the position to be invalidated, when the moving image metadata is moved from the storage area.

(4) The imaging apparatus according to any one of (1) to (3) above, in which the imaging unit captures a first moving image and a second moving image, the first moving image containing a plurality of first images in the time-series order, the second moving image containing a plurality of second images in the time-series order, the offset calculation unit calculates, as a first offset, a difference between a first reference value that is any of the first positions at which the plurality of first images are captured and each of the first positions to associate the first offset with the first image whose first position is acquired, and calculates, as a second offset, a difference between a second reference value that is any of the second positions at which the plurality of second images are captured and each of the second positions to associate the second offset with the second image whose second position is acquired, and the metadata generation unit generates, as first moving image metadata that accompanies the first moving image, metadata containing the first reference value, generates, as second moving image metadata that accompanies the second moving image, metadata containing the second reference value, generates, as first image metadata that accompanies the first image corresponding to the first offset, metadata containing the first offset, for each of the acquired first positions, and generates, as second image metadata that accompanies the second image corresponding to the second offset, metadata containing the second offset, for each of the acquired second positions, the imaging apparatus further including a connection unit to connect the second moving image to the first moving image, associate a first address with the first reference value to add the first address to the first moving image metadata, the first address being an address of the first image metadata, and associate a second address with the second reference value to add the second address to the first moving image data, the second address being an address of the second image metadata.

(5) The imaging apparatus according to (4) above, further including:

a storage unit to store the first moving image, the first moving image metadata, the first image metadata, the second moving image, the second moving image metadata, and the second image metadata in a storage area; and a metadata processing unit to calculate, as a new offset, a difference between the first reference value and the second reference value, when the first moving image metadata is moved from the storage area, replace the second reference value with the new offset in the first moving image metadata, and invalidate the first reference value.

(6) The imaging apparatus according to (4) or (5) above, further including a division unit to divide the first moving image, to which the second moving image is connected, into a third moving image and a fourth moving image, generate fourth moving image metadata that accompanies the fourth moving image and fourth image metadata that accompanies a fourth image contained in the fourth moving image, and associate the reference value and a fourth address to be added to the fourth moving image metadata, the reference value being related to the offset corresponding to the fourth image, the fourth address being an address of the fourth image metadata.

(7) The imaging apparatus according to any one of (1) to (3), in which the imaging unit captures a first moving image and a second moving image, the first moving image containing a plurality of first images in the time-series order, the second moving image containing a plurality of second images in the time-series order, the offset calculation unit calculates, as a first offset, a difference between a first reference value that is any of the first positions at which the plurality of first images are captured and each of the first positions to associate the first offset with the first image whose first position is acquired, and calculates, as a second offset, a difference between a second reference value that is any of the second positions at which the plurality of second images are captured and each of the second positions to associate the second offset with the second image whose second position is acquired, and the metadata generation unit generates, as first moving image metadata that accompanies the first moving image, metadata containing the first reference value and generates, as second moving image metadata that accompanies the second moving image, metadata containing the second reference value, the imaging apparatus further including a connection unit to connect the second moving image to the first moving image and calculate, as a new offset, a difference between the first reference value and the second reference value to add the new offset to the first moving image metadata.

(8) A control method for an imaging apparatus, including:

capturing, by an imaging unit, a moving image containing a plurality of images in a time-series order;

acquiring, by a position acquisition unit, positions at which the plurality of images are captured;

calculating, by an offset calculation unit, as an offset, a difference between a reference value that is any of the positions at which the plurality of images are captured and each of the positions to associate the offset with the image whose position is acquired; and generating, by a metadata generation unit, as moving image metadata that accompanies the moving image, metadata containing the reference value and generating, as image metadata that accompanies the image corresponding to the offset, metadata containing the offset, for each of the acquired positions.

(9) A program for causing a computer to execute:

capturing, by an imaging unit, a moving image containing a plurality of images in a time-series order;

acquiring, by a position acquisition unit, positions at which the plurality of images are captured;

calculating, by an offset calculation unit, as an offset, a difference between a reference value that is any of the positions at which the plurality of images are captured and each of the positions to associate the offset with the image whose position is acquired; and generating, by a metadata generation unit, as moving image metadata that accompanies the moving image, metadata containing the reference value and generating, as image metadata that accompanies the image corresponding to the offset, metadata containing the offset, for each of the acquired positions.

(10) An information processing apparatus, including:

a storage unit to obtain, as moving image metadata that accompanies a moving image, metadata containing a reference value that is any of positions at which a plurality of images contained in the moving image are captured, and obtain, as image metadata that accompanies the image corresponding to an offset, metadata containing the offset that is a difference between the reference value and each of the positions, to store the moving image metadata, the image metadata, and the moving image in a storage area; and a metadata processing unit to invalidate the reference value when the moving image metadata is moved from the storage area.

(11) A control method for an information processing apparatus, including:

obtaining, as moving image metadata that accompanies a moving image, metadata containing a reference value that is any of positions at which a plurality of images contained in the moving image are captured, and obtaining, as image metadata that accompanies the image corresponding to an offset, metadata containing the offset that is a difference between the reference value and each of the positions, to store the moving image metadata, the image metadata, and the moving image in a storage area; and invalidating the reference value when the moving image metadata is moved from the storage area.

(12) A program for causing a computer to execute:

obtaining, by an information processing apparatus, as moving image metadata that accompanies a moving image, metadata containing a reference value that is any of positions at which a plurality of images contained in the moving image are captured, and obtaining, as image metadata that accompanies the image corresponding to an offset, metadata containing the offset that is a difference between the reference value and each of the positions, to store the moving image metadata, the image metadata, and the moving image in a storage area; and invalidating, by a metadata processing unit, the reference value when the moving image metadata is moved from the storage area.

(13) An information processing apparatus, including:

a storage unit to obtain, as first moving image metadata that accompanies a first moving image, metadata containing a first reference value that is any of first positions at which a plurality of first images contained in the first moving image are captured, obtain, as first image metadata that accompanies the first image corresponding to a first offset, metadata containing the first offset that is a difference between the first reference value and each of the first positions, obtain, as second moving image metadata that accompanies a second moving image, metadata containing a second reference value that is any of second positions at which a plurality of second images contained in the second moving image are captured, and obtain, as second image metadata that accompanies the second image corresponding to a second offset, metadata containing the second offset that is a difference between the second reference value and each of the second positions, to store the first moving image metadata, the first image metadata, the first moving image, the second moving image metadata, the second image metadata, and the second moving image; and a connection unit to connect the second moving image to the first moving image and calculate, as a new offset, a difference between the first reference value and the second reference value to add the new offset to the first moving image metadata.

(14) A control method for an information processing apparatus, including:

obtaining, by the information processing apparatus, as first moving image metadata that accompanies a first moving image, metadata containing a first reference value that is any of first positions at which a plurality of first images contained in the first moving image are captured, obtaining, as first image metadata that accompanies the first image corresponding to a first offset, metadata containing the first offset that is a difference between the first reference value and each of the first positions, obtaining, as second moving image metadata that accompanies a second moving image, metadata containing a second reference value that is any of second positions at which a plurality of second images contained in the second moving image are captured, and obtaining, as second image metadata that accompanies the second image corresponding to a second offset, metadata containing the second offset that is a difference between the second reference value and each of the second positions, to store the first moving image metadata, the first image metadata, the first moving image, the second moving image metadata, the second image metadata, and the second moving image; and connecting, by a connection unit, the second moving image to the first moving image and calculating, as a new offset, a difference between the first reference value and the second reference value to add the new offset to the first moving image metadata.

(15) A program for causing a computer to execute:

obtaining, by an information processing apparatus, as first moving image metadata that accompanies a first moving image, metadata containing a first reference value that is any of first positions at which a plurality of first images contained in the first moving image are captured, obtaining, as first image metadata that accompanies the first image corresponding to a first offset, metadata containing the first offset that is a difference between the first reference value and each of the first positions, obtaining, as second moving image metadata that accompanies a second moving image, metadata containing a second reference value that is any of second positions at which a plurality of second images contained in the second moving image are captured, and obtaining, as second image metadata that accompanies the second image corresponding to a second offset, metadata containing the second offset that is a difference between the second reference value and each of the second positions, to store the first moving image metadata, the first image metadata, the first moving image, the second moving image metadata, the second image metadata, and the second moving image; and connecting, by a connection unit, the second moving image to the first moving image and calculating, as a new offset, a difference between the first reference value and the second reference value to add the new offset to the first moving image metadata.

DESCRIPTION OF REFERENCE NUMERALS

100, 101 imaging apparatus
110, 111, 162 imaging unit
120 position information acquisition unit
130 offset calculation unit
140, 141 metadata generation unit
150 processing unit
151 input and output interface
152 ROM
153 RAM
154 bus
155 processor
161 operation unit
163 imaging signal processing unit
164 coding processing unit
165 GPS unit
166 multiplexing unit
167 medium access unit
168 recording medium
169 display control unit
170 display unit
200, 201, 202, 203, 204 information processing apparatus
210 moving image file storage unit
220, 221 connection unit
230 position information registration unit
240 division unit
250, 251, 253 metadata processing unit

The invention claimed is:

1. An imaging apparatus, comprising:
a memory configured to store instructions; and
at least one processor configured to execute the instructions to:
capture a moving image comprising a plurality of images in a time-series order;
acquire geographical position information of the imaging apparatus at which the plurality of images are captured,
wherein the geographical position information is acquired for each image of the plurality of images;
calculate an offset of the geographical position information for each image of the plurality of images based on a difference between a reference value and the corresponding geographical position information of each image of the plurality of images,
wherein the reference value is the geographical position information of one image of the plurality of images in the moving image;
generate moving image metadata that accompanies the moving image,
wherein the moving image metadata comprises the reference value;
generate image metadata that accompanies each image of the plurality of images,
wherein the image metadata comprises the corresponding offset of the geographical position information for each image of the plurality of images; and
invalidate absolute geographical position information of each image of the plurality of images in the moving image based on invalidation of the reference value corresponding to the moving image.

2. The imaging apparatus according to claim 1, wherein the at least one processor is further configured to execute the instructions to:
control storage of the moving image, the moving image metadata, and the image metadata in a storage area; and
invalidate the reference value based on determination that the moving image metadata is moved from the storage area.

3. The imaging apparatus according to claim 1, wherein the geographical position information comprises at least one of a latitude, a longitude, or an altitude of the imaging apparatus at which the plurality of images are captured.

4. The imaging apparatus according to claim 1, wherein the at least one processor is further configured to execute the instructions to set bits in a bit string of data, indicating the reference value, to one of 1 or 0 to invalidate the reference value.

5. The imaging apparatus according to claim 1, wherein the at least one processor is further configured to execute the instructions to set a flag value, present in the image metadata, to invalidate the reference value.

6. A control method, comprising:

capturing a moving image comprising a plurality of images in a time-series order;

acquiring geographical position information of an imaging apparatus at which the plurality of images are captured, wherein the geographical position information is acquired for each image of the plurality of images;

calculating an offset of the geographical position information for each image of the plurality of images based on a difference between a reference value and the corresponding geographical position information of each image of the plurality of images, wherein the reference value is the geographical position information of one image of the plurality of images in the moving image;

generating moving image metadata that accompanies the moving image, wherein the moving image metadata comprises the reference value;

generating image metadata that accompanies each image of the plurality of images, wherein the image metadata comprises the corresponding offset of the geographical position information for each image of the plurality of images; and invalidating absolute geographical position information of each image of the plurality of images in the moving image based on invalidation of the reference value corresponding to the moving image.

7. A non-transitory computer-readable medium having stored thereon computer-executable instructions for causing a computer to execute operations, the operations comprising:

capturing a moving image comprising a plurality of images in a time-series order;

acquiring geographical position information of an imaging unit at which the plurality of images are captured, wherein the geographical position information is acquired for each image of the plurality of images;

calculating an offset of the geographical position information for each image of the plurality of images based on a difference between a reference value and the corresponding geographical position information of each image of the plurality of images, wherein the reference value is the geographical position information of one image of the plurality of images in the moving image;

generating moving image metadata that accompanies the moving image, wherein the moving image metadata comprise the reference value;

generating image metadata that accompanies each image of the plurality of images, wherein the image metadata comprises the corresponding offset of the geographical position information for each image of the plurality of images; and invalidating absolute geographical position information of each image of the plurality of images in the moving image based on invalidation of the reference value corresponding to the moving image.

8. An information processing apparatus, comprising:

a memory configured to store instructions; and at least one processor configured to execute the instructions to:

obtain moving image metadata that accompanies a moving image and includes a reference value, wherein the reference value is geographical position information of one image of a plurality of images included in the moving image;

obtain image metadata that accompanies each image of the plurality of images, wherein the image metadata comprises an offset that is a difference between the reference value and the geographical position information of each image of the plurality of images;

store the moving image metadata, the image metadata, and the moving image in a storage area; and invalidate absolute geographical position information of each image of the plurality of images based on invalidation of the reference value corresponding to the moving image.

9. A control method, comprising:

obtaining moving image metadata that accompanies a moving image and includes a reference value, wherein the reference value is geographical position information of one image of a plurality of images included in the moving image;

obtaining image metadata that accompanies each image of the plurality of images, wherein the image metadata comprises an offset that is a difference between the reference value and the geographical position information of each image of the plurality of images;

storing the moving image metadata, the image metadata, and the moving image in a storage area; and invalidating absolute geographical position information of each image of the plurality of images based on invalidation of the reference value corresponding to the moving image.

10. A non-transitory computer-readable medium having stored computer-executable instructions for causing a computer to execute operations, the operations comprising:

obtaining moving image metadata that accompanies a moving image and includes a reference value, wherein the reference value is geographical position information of one image of a plurality of images included in the moving image;

obtaining image metadata that accompanies each image of the plurality of images, wherein the image metadata comprises an offset that is a difference between the reference value and the geographical position information of each image of the plurality of images;

storing the moving image metadata, the image metadata, and the moving image in a storage area; and invalidating absolute geographical position information of each image of the plurality of images based on invalidation of the reference value corresponding to the moving image.

* * * * *